(12) United States Patent
Frank et al.

(10) Patent No.: US 8,046,007 B2
(45) Date of Patent: *Oct. 25, 2011

(54) AUTO SENSING HOME BASE STATION FOR MOBILE TELEPHONE WITH REMOTE ANSWERING CAPABILITIES

(75) Inventors: Scott M. Frank, Dunwoody, GA (US); Vernon Meadows, Lilburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 784 days.

This patent is subject to a terminal disclaimer.

(21) Appl. No.: 11/733,525

(22) Filed: Apr. 10, 2007

(65) Prior Publication Data

US 2007/0178900 A1    Aug. 2, 2007

Related U.S. Application Data

(63) Continuation of application No. 11/048,132, filed on Feb. 1, 2005, now Pat. No. 7,221,950, which is a continuation of application No. 10/036,206, filed on Dec. 26, 2001, now Pat. No. 7,120,454.

(51) Int. Cl.
*H04W 16/16* (2009.01)
*H04W 4/00* (2009.01)

(52) U.S. Cl. ............ 455/462; 455/561; 455/435.1; 455/554.1

(58) Field of Classification Search .......... 455/560–561, 455/428, 3.04, 41.2, 74.1, 410–411, 426.1–426.2, 455/432.1–433, 435.1, 454, 462, 517, 525, 455/553.1, 554.1–554.2, 555, 556.1, 567; 370/352, 360

See application file for complete search history.

(56) References Cited

U.S. PATENT DOCUMENTS

| | | | |
|---|---|---|---|
| 3,906,166 A | 9/1975 | Cooper | |
| 3,956,596 A | 5/1976 | Connolly | |
| 4,218,590 A * | 8/1980 | Rasmussen et al. | 379/161 |
| 4,268,722 A | 5/1981 | Little | |
| 4,390,963 A | 6/1983 | Puhl | |
| 4,398,265 A | 8/1983 | Puhl | |
| 4,421,952 A | 12/1983 | Barnes | |
| 4,434,461 A | 2/1984 | Puhl | |

(Continued)

FOREIGN PATENT DOCUMENTS

EP    0 342 707    11/1989

(Continued)

OTHER PUBLICATIONS

Depani; U.S. Appl. No. 09/999,806, filed Oct. 24, 2001.

(Continued)

*Primary Examiner* — Kent Chang
*Assistant Examiner* — Marcus Hammonds
(74) *Attorney, Agent, or Firm* — Thomas, Kayden, Horstemeyer & Risley, LLP

(57) ABSTRACT

The present invention discloses in one embodiment a mobile telephone capable of communicating with a home base station through radio signals. The mobile telephone registers with a home base station before beginning to communicate with the home base station. The home base station is capable of sensing the presence of the mobile telephone in its coverage area and subsequently establishing contact with the mobile telephone, if the mobile telephone is registered with the home base station. The home base station can support a plurality of telephone devices, including corded and cordless telephone devices, and provides call placement and answering services to these telephone devices if there is a registered mobile telephone within its coverage area.

20 Claims, 12 Drawing Sheets

U.S. PATENT DOCUMENTS

| | | | |
|---|---|---|---|
| 4,485,486 A | 11/1984 | Webb | |
| 4,486,624 A | 12/1984 | Puhl | |
| 4,528,424 A | 7/1985 | Middleton | |
| 4,549,311 A | 10/1985 | McLaughlin | |
| 4,575,582 A | 3/1986 | Makino | |
| 4,654,655 A | 3/1987 | Kowalski | |
| 4,706,274 A * | 11/1987 | Baker et al. | 455/462 |
| 4,734,928 A | 3/1988 | Weiner | |
| 4,737,975 A | 4/1988 | Shafer | |
| 4,737,978 A | 4/1988 | Burke | |
| 4,741,018 A | 4/1988 | Potratz | |
| 4,748,655 A | 5/1988 | Thrower et al. | |
| 4,751,725 A | 6/1988 | Bonta | |
| 4,775,997 A | 10/1988 | West | |
| 4,775,998 A | 10/1988 | Felix | |
| 4,775,999 A | 10/1988 | Williams | |
| 4,799,253 A | 1/1989 | Stern | |
| 4,843,621 A | 6/1989 | Potratz | |
| 4,868,519 A | 9/1989 | Shafer | |
| 4,890,315 A | 12/1989 | Bendixen | |
| 4,893,327 A | 1/1990 | Stern | |
| 4,922,517 A | 5/1990 | West | |
| 5,020,091 A | 5/1991 | Kropopp | |
| 5,020,094 A | 5/1991 | Rash | |
| 5,046,085 A | 9/1991 | Godsey | |
| 5,134,651 A | 7/1992 | Ortiz | |
| 5,185,779 A | 2/1993 | Dop | |
| 5,222,123 A | 6/1993 | Brown et al. | |
| 5,257,406 A | 10/1993 | Ito | |
| 5,261,121 A | 11/1993 | Hashimoto | |
| 5,311,477 A | 5/1994 | Rastegar | |
| 5,323,418 A | 6/1994 | Ayerst | |
| 5,361,297 A | 11/1994 | Ortiz | |
| 5,367,558 A * | 11/1994 | Gillig et al. | 455/426.1 |
| 5,375,258 A | 12/1994 | Gillig | |
| 5,406,588 A | 4/1995 | Birchler | |
| 5,426,689 A | 6/1995 | Griffith | |
| 5,430,719 A | 7/1995 | Weisser | |
| 5,430,761 A | 7/1995 | Bruckert | |
| 5,444,765 A | 8/1995 | Marui | |
| 5,469,465 A | 11/1995 | Birchler | |
| 5,469,494 A | 11/1995 | Ortiz | |
| 5,471,670 A | 11/1995 | Hess | |
| 5,475,734 A | 12/1995 | McDonald et al. | |
| 5,497,412 A | 3/1996 | Lannen et al. | |
| 5,506,887 A | 4/1996 | Emery | |
| 5,524,061 A | 6/1996 | Mooney | |
| 5,528,666 A * | 6/1996 | Weigand et al. | 455/412.1 |
| 5,530,736 A | 6/1996 | Comer | |
| 5,544,227 A | 8/1996 | Blust | |
| 5,546,444 A | 8/1996 | Roach | |
| 5,548,814 A | 8/1996 | Lorang | |
| 5,574,984 A | 11/1996 | Reed | |
| 5,588,041 A | 12/1996 | Meyer | |
| 5,598,412 A | 1/1997 | Griffith | |
| 5,608,655 A | 3/1997 | Moughanni | |
| 5,610,910 A | 3/1997 | Focsaneanu et al. | |
| 5,629,976 A | 5/1997 | Loke | |
| 5,659,698 A | 8/1997 | Weng | |
| 5,668,561 A | 9/1997 | Perrotta | |
| 5,689,549 A | 11/1997 | Bertocci | |
| 5,689,803 A | 11/1997 | Tayloe | |
| 5,703,933 A | 12/1997 | Ghisler | |
| 5,715,293 A | 2/1998 | Mahoney | |
| 5,715,296 A | 2/1998 | Schornack | |
| 5,721,732 A | 2/1998 | Emeott | |
| 5,751,789 A | 5/1998 | Farris | |
| 5,757,902 A | 5/1998 | Mitsuo | |
| 5,758,281 A * | 5/1998 | Emery et al. | 455/428 |
| 5,764,730 A | 6/1998 | Rabe | |
| 5,771,453 A * | 6/1998 | Haartsen | 455/449 |
| 5,774,857 A | 6/1998 | Newlin | |
| 5,790,631 A | 8/1998 | Minarczik et al. | |
| 5,798,694 A | 8/1998 | Reber | |
| 5,801,654 A | 9/1998 | Traylor | |
| 5,802,481 A | 9/1998 | Prieto | |
| 5,812,637 A | 9/1998 | Schornack | |
| 5,818,824 A | 10/1998 | Lu | |
| 5,826,193 A | 10/1998 | Ghisler et al. | |
| 5,849,433 A | 12/1998 | Venugopal | |
| 5,859,894 A | 1/1999 | Ortiz | |
| 5,875,395 A | 2/1999 | Holmes | |
| 5,877,821 A | 3/1999 | Newlin | |
| 5,901,359 A | 5/1999 | Malmstrom | |
| 5,903,833 A | 5/1999 | Jonsson | |
| 5,920,596 A | 7/1999 | Pan | |
| 5,920,815 A * | 7/1999 | Akhavan | 455/426.1 |
| 5,926,760 A * | 7/1999 | Khan et al. | 455/435.1 |
| 5,937,058 A | 8/1999 | Bleile | |
| 5,946,384 A | 8/1999 | Yee | |
| 5,946,616 A | 8/1999 | Schornack | |
| 5,966,428 A | 10/1999 | Ortiz | |
| 5,970,388 A | 10/1999 | Will | |
| 5,978,469 A * | 11/1999 | Benson | 379/377 |
| 5,982,762 A * | 11/1999 | Anzai et al. | 370/338 |
| 5,982,854 A | 11/1999 | Ehreth | |
| 5,987,678 A | 11/1999 | Ayers | |
| 5,995,839 A | 11/1999 | Coursey | |
| 6,009,086 A | 12/1999 | Freeburg | |
| 6,016,107 A | 1/2000 | Kampe | |
| 6,016,269 A | 1/2000 | Peterson | |
| 6,018,665 A | 1/2000 | Chavez | |
| 6,029,072 A | 2/2000 | Barber | |
| 6,035,215 A | 3/2000 | Goni | |
| 6,035,220 A | 3/2000 | Claudio | |
| 6,038,265 A | 3/2000 | Pan | |
| 6,044,148 A | 3/2000 | Bleile | |
| 6,058,106 A | 5/2000 | Cudak | |
| 6,061,439 A | 5/2000 | Bleile | |
| 6,072,828 A | 6/2000 | Chun | |
| 6,072,858 A | 6/2000 | Bellin | |
| 6,072,869 A | 6/2000 | Becker | |
| 6,078,805 A | 6/2000 | Scott | |
| 6,080,690 A | 6/2000 | Lebby | |
| 6,114,053 A | 9/2000 | Matsuyama | |
| 6,115,388 A | 9/2000 | Chinitz | |
| 6,115,604 A | 9/2000 | Lester | |
| 6,116,014 A | 9/2000 | Dalla Betta | |
| 6,121,881 A | 9/2000 | Bieback | |
| 6,122,515 A | 9/2000 | Ito | |
| 6,122,531 A | 9/2000 | Nicholls | |
| 6,134,314 A | 10/2000 | Dougherty | |
| 6,137,466 A | 10/2000 | Moughanni | |
| 6,138,026 A | 10/2000 | Irvin | |
| 6,141,341 A | 10/2000 | Jones | |
| 6,151,500 A | 11/2000 | Cardina | |
| 6,157,545 A | 12/2000 | Janninck | |
| 6,188,888 B1 | 2/2001 | Bartle | |
| 6,192,231 B1 | 2/2001 | Chapman | |
| 6,198,947 B1 | 3/2001 | Barber | |
| 6,212,396 B1 | 4/2001 | Brown | |
| 6,230,031 B1 | 5/2001 | Barber | |
| 6,240,277 B1 | 5/2001 | Bright | |
| 6,252,867 B1 | 6/2001 | Pfeil | |
| 6,253,088 B1 * | 6/2001 | Wenk et al. | 455/462 |
| 6,259,925 B1 | 7/2001 | Josse | |
| 6,282,564 B1 | 8/2001 | Smith | |
| 6,295,348 B1 | 9/2001 | Bleile | |
| 6,301,474 B1 | 10/2001 | Hartmaier et al. | |
| 6,314,299 B1 | 11/2001 | Schreib | |
| 6,317,064 B1 | 11/2001 | Ferrer | |
| 6,324,410 B1 | 11/2001 | Giacopelli | |
| 6,330,247 B1 | 12/2001 | Chang | |
| 6,331,972 B1 | 12/2001 | Harris | |
| 6,396,413 B2 | 5/2002 | Hines | |
| 6,396,457 B1 | 5/2002 | Gatherer | |
| 6,405,027 B1 | 6/2002 | Bell | |
| 6,411,802 B1 | 6/2002 | Cardina | |
| 6,429,811 B1 | 8/2002 | Zhao | |
| 6,434,394 B1 | 8/2002 | Grundvig | |
| 6,453,154 B1 | 9/2002 | Haber | |
| 6,459,688 B1 * | 10/2002 | Bursztejn et al. | 370/329 |
| 6,466,799 B1 | 10/2002 | Torrey | |
| 6,470,187 B1 | 10/2002 | Rosen | |
| 6,480,714 B1 | 11/2002 | DePani | |
| 6,529,707 B1 * | 3/2003 | Dent | 455/13.1 |
| 6,529,746 B1 | 3/2003 | Kotzin | |

| | | | |
|---|---|---|---|
| 6,573,938 | B1 | 6/2003 | Schulz |
| 6,577,952 | B2 | 6/2003 | Geier |
| 6,600,734 | B1 | 7/2003 | Gernert |
| 6,615,056 | B1 | 9/2003 | Taylor |
| 6,690,923 | B1 | 2/2004 | Ortiz |
| 6,704,580 | B1 * | 3/2004 | Fintel .................. 455/550.1 |
| 6,741,835 | B2 | 5/2004 | Pulver |
| 6,757,528 | B1 | 6/2004 | Cardina |
| 6,775,522 | B2 | 8/2004 | Schornack |
| 6,778,824 | B2 | 8/2004 | Wonak |
| 6,781,481 | B2 | 8/2004 | Richardson |
| 6,792,095 | B1 | 9/2004 | Frank |
| 6,978,141 | B2 | 12/2005 | Smith et al. |
| 6,978,154 | B1 * | 12/2005 | Ospalak et al. ............ 455/557 |
| 7,003,287 | B2 | 2/2006 | Roeder |
| 7,035,633 | B2 | 4/2006 | Kirkpatrick |
| 7,085,566 | B1 * | 8/2006 | Burchard et al. .......... 455/434 |
| 7,120,426 | B2 | 10/2006 | Link, II et al. |
| 7,120,454 | B1 | 10/2006 | Frank |
| 7,130,609 | B2 | 10/2006 | Cardina |
| 7,149,514 | B1 | 12/2006 | DePani |
| 7,221,950 | B2 | 5/2007 | Frank |
| 7,363,034 | B2 | 4/2008 | DePani |
| 7,437,148 | B1 * | 10/2008 | Vaghi et al. ............... 455/417 |
| 2001/0040512 | A1 | 11/2001 | Hines et al. |
| 2001/0041533 | A1 | 11/2001 | Schornack et al. |
| 2002/0044641 | A1 | 4/2002 | Wanner |
| 2002/0086666 | A1 | 7/2002 | Chen |
| 2002/0093948 | A1 | 7/2002 | Dertz et al. |
| 2002/0094776 | A1 | 7/2002 | Pulver |
| 2002/0137498 | A1 | 9/2002 | Goss et al. |
| 2002/0146977 | A1 | 10/2002 | Schornack et al. |
| 2003/0108189 | A1 | 6/2003 | Barzani |
| 2003/0128115 | A1 | 7/2003 | Giacopelli et al. |
| 2003/0134661 | A1 | 7/2003 | Rudd et al. |
| 2003/0156660 | A1 | 8/2003 | Zoltowski et al. |
| 2003/0190018 | A1 | 10/2003 | Bleile et al. |
| 2003/0235219 | A1 | 12/2003 | Kapadia et al. |
| 2004/0024660 | A1 | 2/2004 | Ganesh et al. |
| 2004/0045096 | A1 | 3/2004 | Mani et al. |
| 2004/0160372 | A1 | 8/2004 | Pulver |
| 2004/0165681 | A1 | 8/2004 | Mohan |
| 2004/0177310 | A1 | 9/2004 | Mohan et al. |
| 2004/0178905 | A1 | 9/2004 | Dernier et al. |
| 2004/0214569 | A1 | 10/2004 | Cardina et al. |
| 2004/0266418 | A1 | 12/2004 | Kotzin |
| 2004/0267535 | A1 | 12/2004 | Kotzin |
| 2005/0271080 | A1 | 12/2005 | Gorman |
| 2008/0096528 | A1 | 4/2008 | DePani |

FOREIGN PATENT DOCUMENTS

| | | |
|---|---|---|
| GB | 2 253 119 | 8/1992 |
| GB | 2 283 881 | 5/1995 |
| GB | 2 285 556 | 7/1995 |
| WO | 98/28929 | 7/1998 |
| WO | 01/58181 | 8/2001 |

OTHER PUBLICATIONS

Depani; U.S. Appl. No. 09/126,268, filed Jul. 30, 1998.
Depani; U.S. Appl. No. 11/322,532, filed Dec. 30, 2005.
Frank; U.S. Appl. No. 10/036,206, filed Dec. 26, 2001.
Frank; U.S. Appl. No. 11/048,132, filed Feb. 1, 2005.
Depani; U.S. Appl. No. 11/952,510, filed Dec. 7, 2007.
Cardina; U.S. Appl. No. 09/268,591, filed Mar. 15, 1999.
Cardina; U.S. Appl. No. 10/851,932, filed May 21, 2004.
Cardina; U.S. Appl. No. 11/554,186, filed Oct. 30, 2006.
Depani; Non-Final Rejection mailed Jul. 7, 2004 for U.S. Appl. No. 09/999,806, filed Oct. 24, 2001.
Depani; Non-Final Rejection mailed Nov. 30, 2005 for U.S. Appl. No. 09/999,806, filed Oct. 24, 2001.
Depani; Notice of Allowance and Fees Due mailed Mar. 23, 2005 for U.S. Appl. No. 09/999,806, filed Oct. 24, 2001.
Depani; Notice of allowance and Fees Due mailed Apr. 5, 2006 for U.S. Appl. No. 09/999,806, filed Oct. 24, 2001.
Depani; Notice of Allowance and Fees Due mailed Aug. 7, 2006 for U.S. Appl. No. 09/999,806, filed Oct. 24, 2001.
Depani; Final Rejection mailed Jul. 5, 2001 for U.S. Appl. No. 09/126,268, filed Jul. 30, 1998.
Depani; Non-Final Rejection mailed Sep. 27, 2000 for U.S. Appl. No. 09/126,268, filed Jul. 30, 1998.
Depani; Notice of Allowance and Fees Due mailed Jun. 21, 2002 for U.S. Appl. No. 09/126,268, filed Jul. 30, 1998.
Depani; Examiner Interview Summary mailed Jul. 18, 2007 for U.S. Appl. No. 11/322,532, filed Dec. 30, 2005.
Depani; Non-Final Rejection mailed Apr. 11, 2007 for U.S. Appl. No. 11/322,532, filed Dec. 30, 2005.
Depani; Notice of Allowance and Fees Due mailed Jul. 26, 2007 for U.S. Appl. No. 11/322,532, filed Dec. 30, 2005.
Depani; Notice of Allowance and Fees Due mailed Oct. 23, 2007 for U.S. Appl. No. 11/322,532, filed Dec. 30, 2005.
Frank; Examiner Interview Summary mailed Mar. 14, 2006 for U.S. Appl. No. 10/036,206, filed Dec. 26, 2001.
Frank; Non-Final Rejection mailed Jan. 28, 2004 for U.S. Appl. No. 10/036,206, filed Dec. 26, 2001.
Frank; Non-Final Rejection mailed May 5, 2005 for U.S. Appl. No. 10/036,206, filed Dec. 26, 2001.
Frank; Non-Final Rejection mailed Jul. 19, 2004 for U.S. Appl. No. 10/036,206, filed Dec. 26, 2001.
Frank; Non-Final Rejection mailed Dec. 23, 2005 for U.S. Appl. No. 10/036,206, filed Dec. 26, 2001.
Frank; Notice of Allowance and Fees Due mailed Jan. 4, 2005 for U.S. Appl. No. 10/036,206, filed Dec. 26, 2001.
Rank; Notice of Allowance and Fees Due mailed Apr. 6, 2006 for U.S. Appl. No. 10/036,206 filed Dec. 26, 2001.
Frank; Notice of Allowance and Fees Due mailed Sep. 7, 2005 for U.S. Appl. No. 10/036,206, filed Dec. 26, 2001.
Frank; Examiner Interview Summary mailed Mar. 14, 2006 for U.S. Appl. No. 11/048,132, filed Feb. 1, 2005.
Frank; Examiner Interview Summary mailed Oct. 19, 2006 for U.S. Appl. No. 11/048,132, filed Feb. 1, 2005.
Frank; Final Rejection mailed Jun. 20, 2006 for U.S. Appl. No. 11/048,132, filed Feb. 1, 2005.
Frank; Non-Final Rejection mailed Nov. 30, 2005 for U.S. Appl. No. 11/048,132, filed Feb. 1, 2005.
Frank; Notice of Allowance and Fees Due mailed Feb. 23, 2007 for U.S. Appl. No. 11/048,132, filed Feb. 1, 2005.
Cardina; Final Rejection mailed May 1, 2001 for U.S. Appl. No. 09/268,591, filed Mar. 15, 1999.
Cardina; Non-Final Rejection mailed Oct. 25, 2000 for U.S. Appl. No. 09/268,591, filed Mar. 15, 1999.
Cardina; Notice of Allowance and Fees Due mailed Oct. 23, 2001 for U.S. Appl. No. 09/268,591, filed Mar. 15, 1999.
Cardina; Non-Final Rejection mailed Aug. 15, 2003 for U.S. Appl. No. 10/055,212, filed Jan. 22, 2002.
Cardina; Notice of Allowance and Fees Due mailed Feb. 24, 2004 for U.S. Appl. No. 10/055,212, filed Jan. 22, 2002.
Cardina; Notice of Allowance and Fees Due mailed Jul. 3, 2006 for U.S. Appl. No. 10/851,932, filed May 21, 2004.
Depani; Non-Final Office Action mailed Feb. 7, 2011 for U.S. Appl. No. 11/952,510, filed Dec. 7, 2007.
Cardina; Non-Final Rejection mailed Mar. 31, 2009 for U.S. Appl. No. 11/554,186, filed Oct. 30, 2006.

* cited by examiner

AUTO SENSING HOME BASE STATION FOR MOBILE TELEPHONE WITH REMOTE ANSWERING CAPABILITIES

CROSS REFERENCE

This application is a continuation of U.S. application Ser. No. 11/048,132, filed Feb. 1, 2005, which is a continuation of U.S. application Ser. No. 10/036,206, filed Dec. 26, 2001, now U.S. Pat. No. 7,120,454, issued Oct. 10, 2006, which are entirely incorporated herein by reference.

FIELD OF THE INVENTION

This invention relates in general to telephonic communications and more particularly relates to wireless communications via a home base station.

BACKGROUND OF THE INVENTION

Mobile and satellite telephones have gained popularity in recent years in all walks of life. Mobile telephones are not only popular with executives in busy metropolitan areas, but are also popular in sparsely populated areas where the cost, per user, of laying down the infrastructure for traditional wireline telephones is high. Also, people who move their residence from one geographic location to another are beginning to use their mobile telephone number as their residence telephone number to avoid having to notify people of telephone number changes. Significantly lower mobile telephone prices in recent years has also prompted many telecommunication users to use a mobile telephone as their primary residential telephone in lieu of the traditional wireline telephone.

Typical mobile telephone (MT) systems are characterized by dividing a radio coverage area into several smaller coverage areas or "cells" using lower power transmitters and coverage-restricted receivers. As shown in U.S. Pat. Nos. 3,906, 166 and 4,268,722, which are incorporated by reference herein, the limited coverage area enables the radio channels used in one cell to be reused in another cell. As a mobile telephone in one cell moves across the boundary of the cell and into an adjacent cell, control circuitry associated with the cells detects that the signal strength of the mobile telephone in the just-entered cell is stronger, and communications with the mobile telephone are "handed off" to the just-entered cell. Thus, a system can supply two-way communications for an array of cells, thereby supplying communications for a much wider area than conventional two-way radios.

The terms, mobile telephone, cellular telephone, and radiotelephone are used interchangeably in this application, and they encompass communication devices that use radio signals for communication. The radio signals may be in the spectrum traditionally known as cellular band or PCS (personal communication system) band. The radio signals also may be in any other spectrum assigned for mobile communications. Besides land-based systems, a satellite based communications system also has gained popularity. In the satellite based system, satellite receives signal from satellite telephone network and beams call to satellite telephone. Relatively new, but as prices of these satellite telephones come down, many telecommunication users will begin to use the satellite telephone as their primary residential telephone.

Generally, mobile telephones provide an individual with flexibility, but create an unforeseen problem when used as the primary residential telephone. Traditionally in a residential setting, there are many telephone extensions throughout a user's house. When an incoming call arrives, it rings all the telephone devices connected to the line, and the user can answer the call from any extension.

However, when the mobile telephone is the primary and only telephone in the house, the user must carry the mobile telephone all the time to answer it promptly or run to the mobile telephone every time it rings. Another problem with using a mobile telephone as the primary telephone in any location is that only one person can listen to the conversation. Normally, if there is more than one telephone device connected to a telephone line, there can be one person per telephone device listening and talking to a caller on the other end of the telephone connection. A mobile telephone provides only one device for listening and talking to the other caller. Clearly, it is inconvenient not to allow more than one person to listen to a telephone conversation, and it is even more undesirable to run through the house searching for the mobile telephone every time an incoming call arrives.

SUMMARY OF THE INVENTION

The present invention allows individuals who do not have direct access to a PSTN to communicate and receive communication at their homes, offices, or other locations in a convenient manner through use of their mobile telephones. More particularly, a preferred embodiment of the present invention employs a home base station (HBS) that is capable of sensing the presence of mobile telephones and communicating with mobile telephones. The home base station is in communication with a plurality of telephone devices, such as conventional corded telephone devices or cordless telephone devices or devices specially designed for use with the home base station. The methodology of the present invention defines communications between a mobile telephone and a home base station. Additionally, the present invention allows a telephone device to communicate through a mobile telephone.

The HBS has a mobile telephone interface unit (MTIU) connected to a transceiver, a controller, a mobile telephone registration unit (RRU), a local telephone interface unit (LTIU), which is connected to a corded telephone interface unit (CTIU) and a cordless telephone interface unit (CLTIU). According to the present invention, a mobile telephone is equipped with a HBS interface unit and capable of receiving and transmitting radio signals to and from the HBS. The home base station uses radio signals of a frequency different from the frequency used by the systems. The communications between the HBS and the mobile telephone utilize a communication protocol, and, in a preferred embodiment, the communications between the HBS and a mobile telephone utilizes the Bluetooth protocol.

A user first registers his mobile telephone with a BBS. Subsequently, the HBS is capable of sensing the presence of the registered mobile telephone. The RRU registers the mobile telephone by storing its information in a memory. When the HBS detects the signals of a mobile telephone, it compares the signals with the information stored by the RRU, and if they match, the HBS starts to communicate with the mobile telephone.

After sensing that a registered mobile telephone is within its coverage area, the HBS communicates with the mobile telephone and sends its information to the mobile telephone. The HBS also enables dial tones to the telephone devices, which are associated with it.

If the user picks up a telephone device located in his bedroom, he will get a dial tone and can then dial a destination number. The HBS receives the dialed telephone number and requests that the mobile telephone make a connection to the dialed number. The mobile telephone makes a request for a telephonic connection to the dialed number as if the dialed number was entered from its own keypad. After the connection is made, the user can talk on his telephone device as if the connection was made through the telephone device.

When the mobile telephone receives an incoming call, the mobile telephone will pass the information to the HBS, and the HBS will send the ringing tone to all telephone devices connected to the HBS. The user can answer the call from any telephone device connected to the HBS including the mobile telephone.

If the user takes the mobile telephone and leaves the HBS' coverage area, the HBS will sense that the radio signals from the mobile telephone are fading, and subsequently the HBS will cease to provide dial tones to the telephone devices connected to it.

The HBS is also capable of providing privacy to the user using the mobile telephone or a telephone device to place or to receive a call. The user may activate the privacy feature by sending a message from the mobile telephone or the telephone device to the HBS, and the HBS will block other telephone devices from listening into the call.

DESCRIPTION OF THE DRAWINGS

The foregoing and other aspects and advantages of the invention described herein will be better understood from the following detailed description of one or more preferred embodiments of the invention with reference to the drawings in which.

DETAILED DESCRIPTION OF THE INVENTION

As required, detailed embodiments of the present invention are disclosed herein. However, it is to be understood that the disclosed embodiments are merely exemplary of the invention(s) that may be embodied in various and alternative forms. The figures are not necessarily to scale; some features may be exaggerated or minimized to show details of particular components; some steps of a process may not need to be the exact sequence as shown. Therefore, specific structural, functional details, and process steps disclosed herein are not to be interpreted as limiting, but merely as a basis for the claims and as a representative basis for teaching one skilled in the art to variously employ the present invention.

Figure 1:
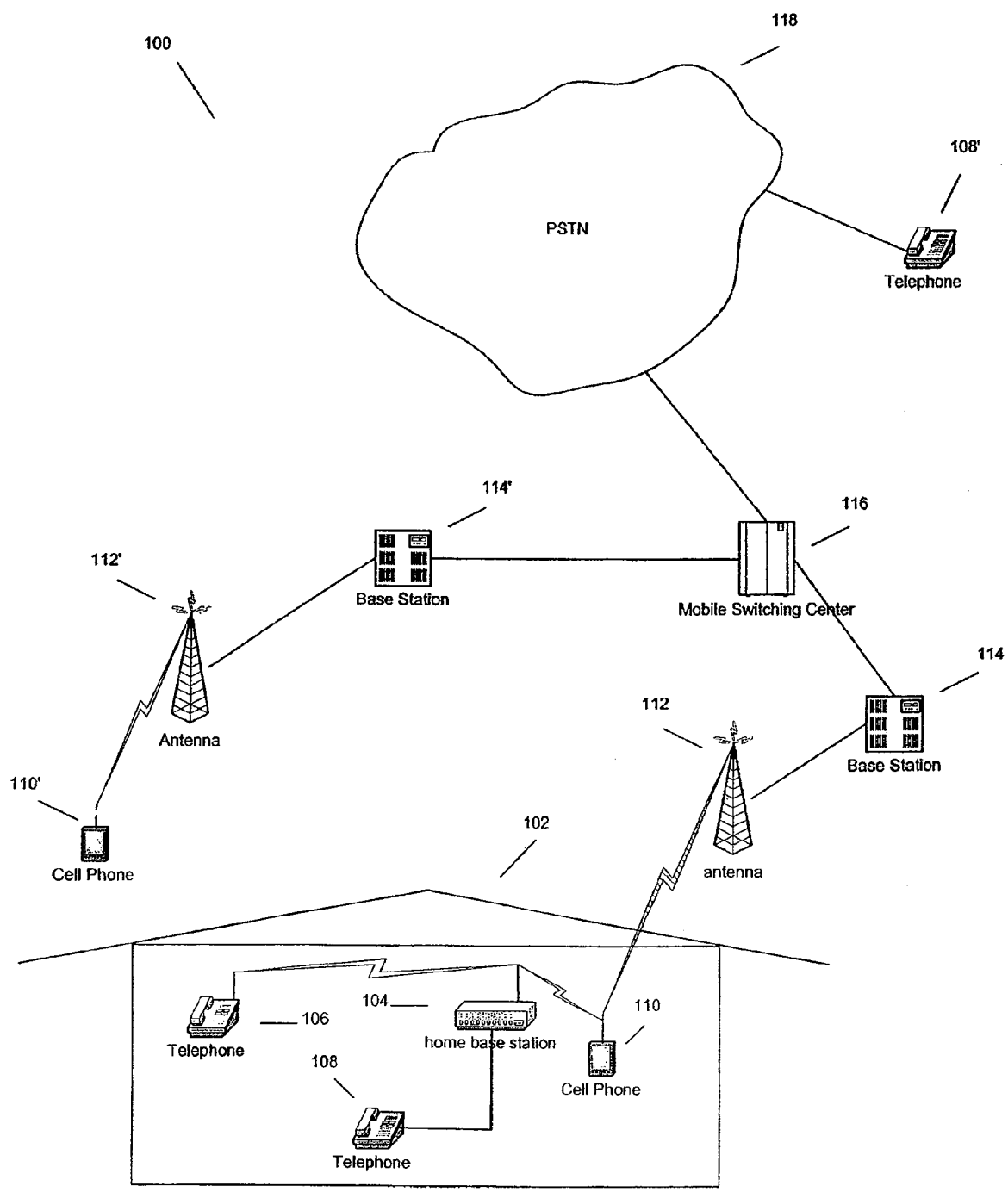
FIG. 1 depicts the architecture of a telephone system where the present invention is employed.

Referring now in greater detail to the drawings, in which like numerals represent like components throughout several views, FIG. 1 illustrates employment of a system according to the present invention in a telecommunication environment 100. A home base station (HBS) 104 according to the present invention is generally employed in a user's home or office 102. The HBS 104 may support one or multiple telephone devices, either corded telephone devices 108 or cordless telephone devices 106 or a combination of corded and cordless telephone devices. The HBS 104 communicates with a wireless telephone network through a mobile telephone 110.

In this application a telephone device may be a traditional telephone device, either corded or cordless, used with a landline telephone network or the PSTN or may be a device specially designed to operate with the HBS. The telephone device may or may not have all the features commonly seen on a traditional telephone device.

According to the present invention, the mobile telephone 110 is capable of communicating with the HBS 104 through radio signals. In one preferred embodiment, the communication between the HBS 104 and the mobile telephone 110 follows a standard wireless protocol such as the Bluetooth protocol. Other communications protocols may also be employed.

In the diagram shown in FIG. 1, a user (not shown) can use a telephone device 106 to place a call to a mobile telephone 110'. The call is routed through the HBS 104, the mobile telephone 110, an antenna 112 of a wireless network, and a base station 114 to reach a mobile switching center (MSC) 116, where the call is processed. After analyzing the dialed number, the MSC 116 routes the call through another base station 114' and another antenna 112' to reach the called mobile telephone 110'.

The user can also receive a call initiated by a party using a wireline telephone 108' connected to the Public Switched Telephone Network (PSTN) 118. The call is switched through the PSTN 118 and the wireless network to reach the mobile telephone 110 and finally answered by the user on the telephone device 108 connected to the HBS 104.

Figure 2:
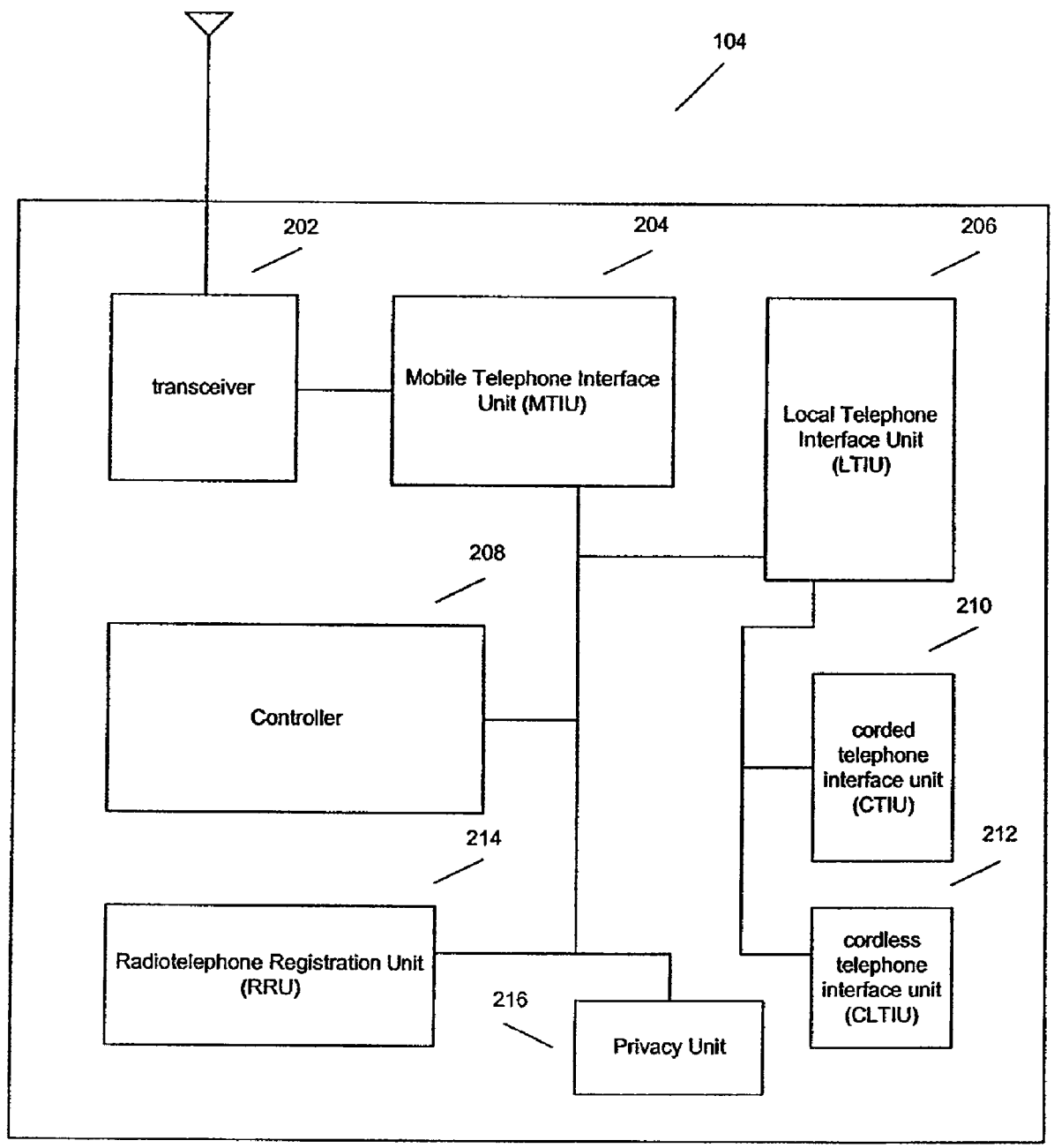
FIG. 2 depicts an exemplary architecture of a home base station (HBS) according to the present invention.

FIG. 2 depicts the architecture of one embodiment of a home base station 104. Generally, a HBS 104 has the following functional components: a controller 208, a mobile telephone registration unit (RRU) 214, a mobile telephone interface unit (MTIU) 204, a transceiver 202, a local telephone interface unit (LTIU) 206, a corded telephone interface unit (CTIU) 210, a cordless telephone interface unit (CLTIU) 212, and a privacy unit 216. Those skilled in the art will appreciate that functional components other than those listed above may provide similar or equivalent functions.

The HBS 104 communicates with both mobile telephones and telephone devices. The HBS 104 communicates with one or more mobile telephones 110 through the MTIU 204 and the transceiver 202. The transceiver 202 is capable of modulating and demodulating radio signals, besides transmitting and receiving the same radio signals. The MTIU 204 is responsible for communicating with the mobile telephones 110, and the communication between the HBS and the mobile telephones can follow the Bluetooth standard or other radio communication standards.

The HBS 104 communicates with telephone devices, corded 108 or cordless 106, through the LTIU 206. The interface to a corded telephone device 108 is through the CTIU 210, and the interface to a cordless telephone device 106 is through the CLTIU 212. The LTIU 206 is capable of detecting when a telephone device is off hook and providing a dial tone to the telephone device. If the telephone device is a cordless telephone device 106, the actual tone is provided by the cordless handset under instruction from the HBS 104.

The RRU 214 is responsible for registering mobile telephones. In a preferred embodiment, the HBS 104 may register more than one mobile telephone 110. The HBS may also include a registration button (not shown), which allows a user to register the mobile telephone with the HBS upon pressing the registration button. The registration button may also be displayed on a user interface screen on the HBS. The RRU 214 stores the telephone number and the corresponding electronic identification number (EIN) of each mobile telephone 110. These numbers are received from the mobile telephone 110 during the registration procedure and used during the connection procedure. The RRU 214 also provides the telephone number to the LTIU 206, so it can be displayed by a corded telephone device 108 or a cordless telephone device 106, when a call is received. The telephone number identifies which mobile telephone 110 received the incoming call when the HBS 104 supports multiple mobile telephones 110.

The controller 208 oversees all the operations performed by the HBS 104. The controller 208 works with the MTIU 204 to detect the presence of a mobile telephone 110 and with the RRU 214 to register a mobile telephone 110. The controller 208 also controls the telephone devices through LTIU 206.

The privacy unit 216 enables the HBS 104 to provide privacy to a telephone device or a mobile telephone that the user is using to communicate with a remote party. If the user desires privacy while placing or responding to a telephone call, the user can instruct the telephone device or the mobile telephone to send a privacy request to the HBS 104. When a privacy request is received, the privacy unit 216 determines its originating device, i.e., whether the request is from a mobile telephone or a telephone device. If the privacy request is from the mobile telephone, the privacy unit 216 will disable the audio communication to the telephone devices, and a third party, who picks up a telephone device, will not be able to listen to the communication. If the privacy request is from a telephone device, the privacy unit 216 will disable the audio communication to other telephone devices and instruct the mobile telephone to disable its audio input and output devices by sending a privacy request to the mobile telephone. The mobile telephone in this situation acts only as a transmitting device to the HBS.

The privacy request may be communicated from a telephone device or a mobile telephone to the HBS by pressing a special privacy button, if one is available, or a special sequence of existing buttons. The special sequence of buttons is interpreted by the HBS as a special instruction to itself, instead of a command to be transmitted to a remote party. Those skilled in the art will appreciate other ways to communicate the privacy request.

In an alternative embodiment, the HBS 104 can provide the functionality of an intercom system. The HBS 104 can support one telephone device connected to the HBS calling another telephone device connected to the same HBS 104. The LTIU 206 sequentially numbers the actual telephone connections supported by the CTIU 210 and the CLTIU 212 besides assigning a number to the mobile telephone. For example, if the HBS 104 has four connections for a corded telephone device and one connection for a cordless telephone device, the LTIU 206 could assign 0 to the mobile telephone, 1 to the cordless telephone device, and 2-5 to the corded telephone devices. A user on the corded telephone 4 may dial "*1" to ring the bell of the cordless telephone, and, if a part answers at the cordless telephone, they will be connected through the HBS 104.

In yet another embodiment, the HBS 104 may be equipped with a user interface screen, when different messages can be displayed and inputs taken from the user. The interface screen may be a touch screen, where the user may input commands or settings to the HBS. The interface screen would be connected to a user interface unit (not shown in FIG. 2), which is connected to the controller 208.

Figure 3:
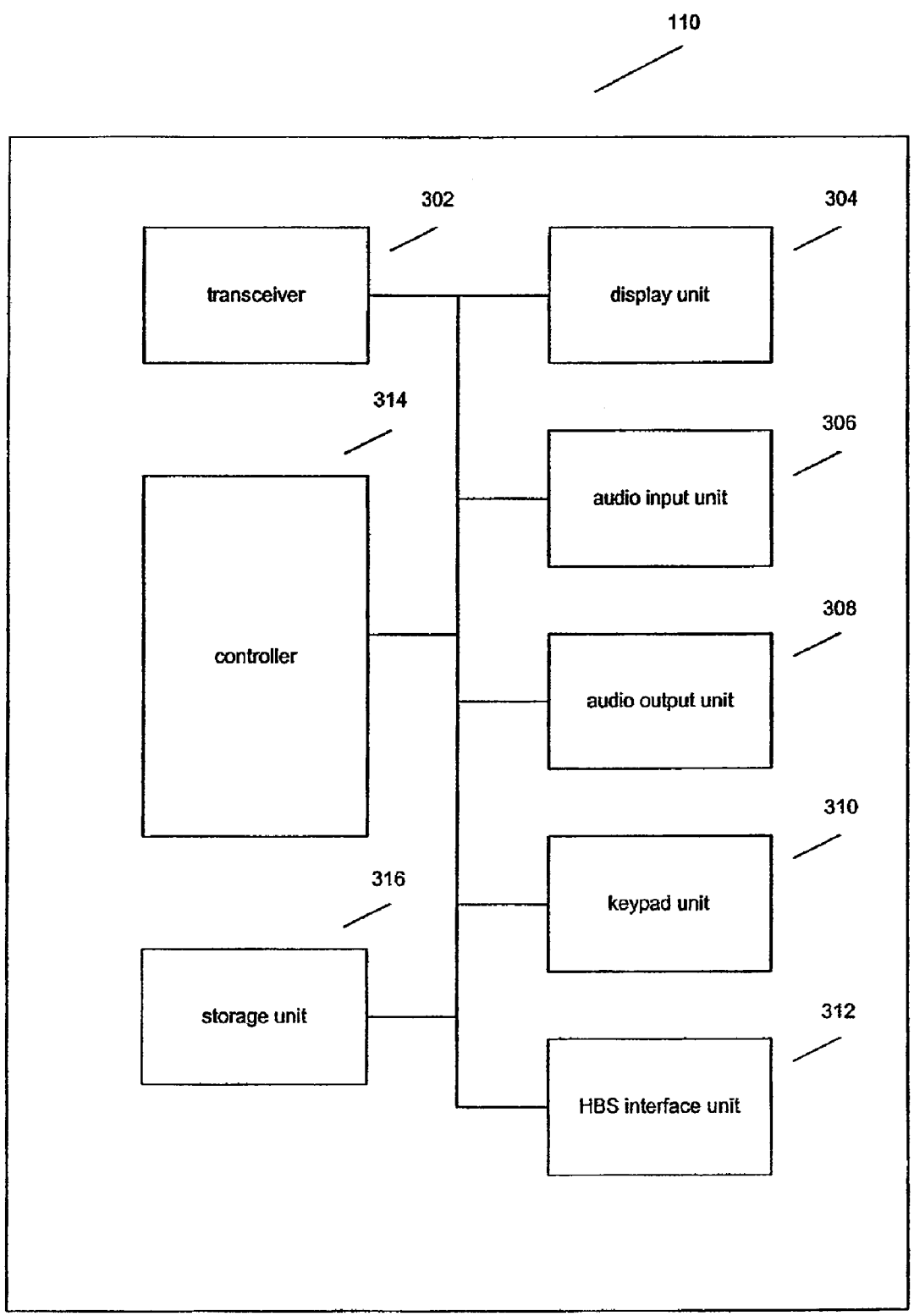
FIG. 3 depicts an exemplary architecture of a mobile telephone according to the present invention.

FIG. 3 illustrates the architecture of a mobile telephone 110 according to one embodiment of the present invention. In addition to all the normal capabilities of a mobile telephone, the mobile telephone 110 according to the present invention also has the capability to communicate through different radio signals to the HBS 104. The communications with the HBS 104 is through frequencies different than those allocated for cellular systems and personal communications systems (PCS). One example of such frequencies is the industrial, scientific, and medical (ISM) spectrum, which is in the range of 2.4 GHz. The communications protocol may be proprietary or may follow an industry standard, such as the Bluetooth protocol.

A mobile telephone 110 typically has a controller 314, a transceiver 302, a display unit 304, an audio input unit 306, an audio output unit 308, a keypad unit 310, a HBS interface unit 312, and a storage unit 316. Those skilled in the art will appreciate that functional components other than those listed above may provide similar or equivalent functions.

The mobile telephone 110 performs its ordinary functions of communicating with a wireless network through the controller 314, the transceiver 302, the display unit 304, the audio input unit 306, the audio output unit 308, the keypad unit 310, and the storage unit 316. The audio output unit 308 can support an earpiece speaker, which allows the user a hands free conversation while driving an automobile, and a speaker. The transceiver 302 is responsible for communicating with the wireless network, while the display unit 304 controls the display of an output screen, which typically is a liquid crystal display (LCD) screen. The keypad unit 310 is responsible for receiving inputs from the mobile telephone's keypad.

The mobile telephone 110 communicates with the HBS 104 through the HBS interface unit 312. The HBS interface unit 312 employs other components in its communications with the HBS 104 as necessary. The HBS interface unit 312 emits a radio signal indicating the presence of the mobile telephone 110 to the HBS 104 and receives a communication request from the HBS 104. The HBS interface unit 312 also handles the registration procedure between the mobile telephone 110 and the HBS 104 and stores the HBS 104 identification information in the storage unit 316. The mobile telephone 110 establishes communications with a HBS 104 only if the HBS' 104 identification matches the one stored in the storage unit 316.

In an alternative embodiment, a mobile telephone 110 can register with more than one HBS 104 and a HBS 104 can also register more than one mobile telephone 110.

Generally, the mobile telephone 110 operates in the registration mode and the communication mode, and the mobile telephone 110 may switch between these two modes. While operating in the registration mode, the mobile telephone 110 can register itself with a HBS 104 and receive registration information from the HBS 104. While in the communication mode, the mobile telephone 110 can receive and place a call to and from a wireless telephone network, and the call can be initiated by either the mobile telephone 110 or a telephone device connected to the HBS 104.

Similarly, the HBS 104 also operates in the registration mode and the communication mode. When in the registration mode, the HBS 104 can register a mobile telephone 110 and send its information to the mobile telephone 110. When in the communication mode, the HBS 104 can receive and place a call to and from a wireless telephone network, and the call can be initiated by either the mobile telephone 110 or a telephone device connected to the HBS 104.

Those skilled in the art will appreciate that the mobile telephone 110 and the HBS 104 may operate in other modes, such as maintenance mode, set up mode, etc.

Figure 4:
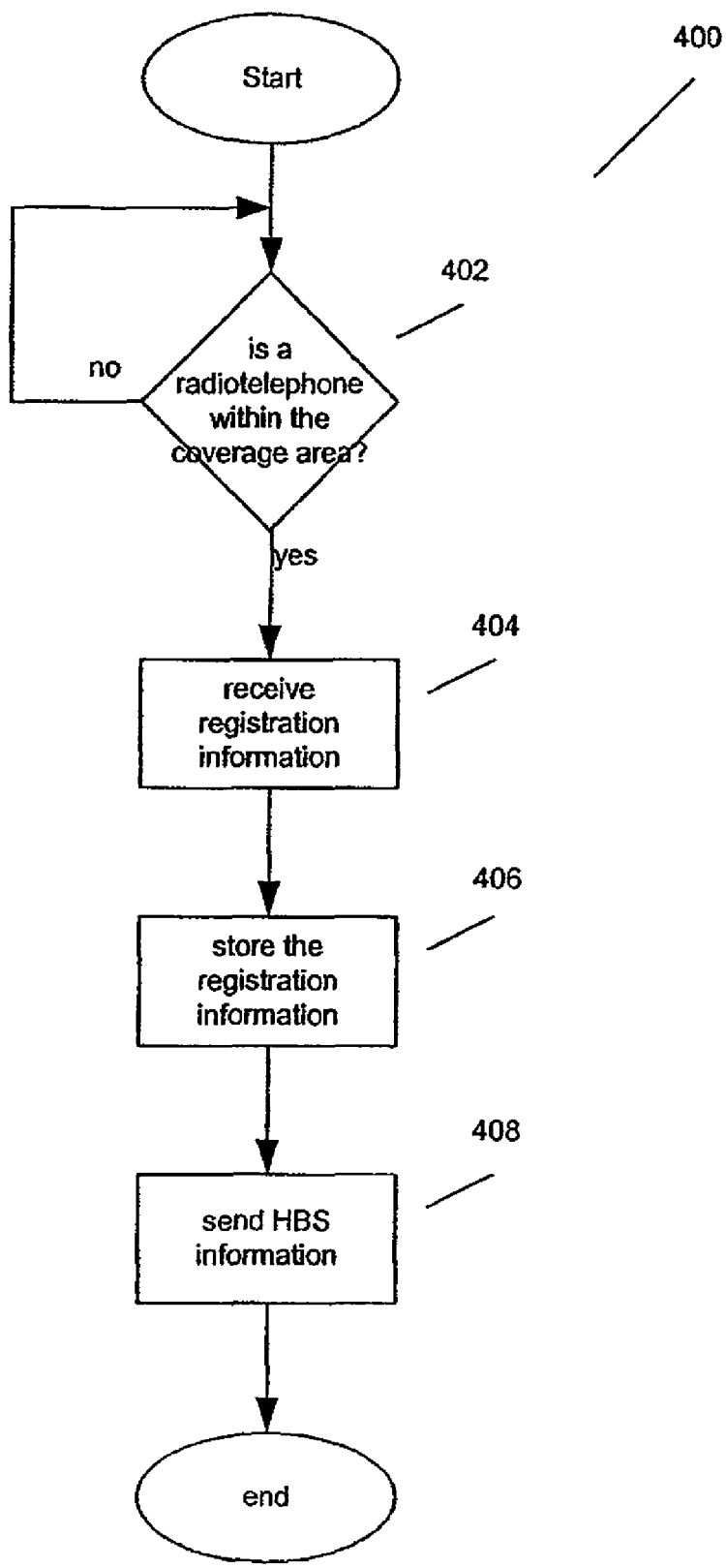
FIG. 4 depicts a HBS process for registering a mobile telephone.
Figure 5:
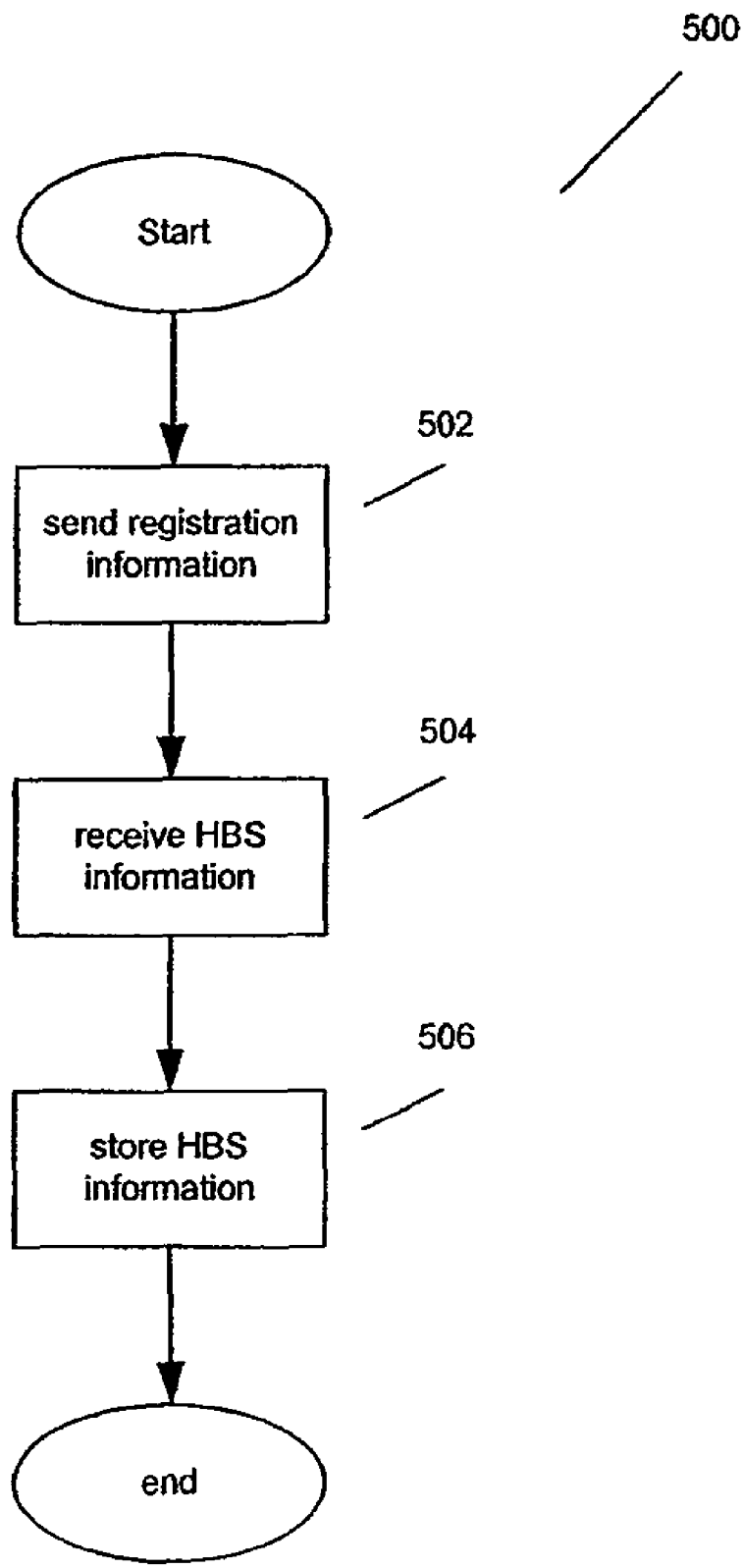
FIG. 5 depicts a mobile telephone process for registering with a HBS.

FIGS. 4-5 describe the operation of the registration mode for the mobile telephone 110 and the HBS 104.

FIGS. 6-12 describe different operations in the communication mode for the mobile telephone 110 and the HBS 104.

FIG. 4 depicts a registration process 400 for the HBS 104. The HBS 104 can enter the registration mode in different ways. For example, the HBS 104 may activate the registration process in response to the user pressing a registration button or in response to other commands. Once the HBS 104 enters the registration mode, it checks whether a mobile telephone is within its coverage area, block 402. The HBS 104 detects the presence of a mobile telephone 110 by detecting radio signals emitted by the mobile telephone 110. If a mobile telephone 110 is within its coverage area, the HBS 104 receives the mobile telephone's registration information, block 404, which is embedded in the radio signals, and stores it, block 406. The HBS 104 then sends its information, which may include its identification information, to the mobile telephone, block 408.

FIG. 5 depicts a registration process 500 for a mobile telephone 110. The mobile telephone 110 enters the registration mode when the registration feature is activated by a user. After the user activates the registration feature, for example, by pressing the feature activation button on the mobile telephone 110, the mobile telephone 110 sends out a signal with its registration information, block 502, which has the mobile telephone's identification information. After sending out its registration information, the mobile telephone 110 waits to receive the HBS information. The HBS information may include the identification number for the HBS 104 and/or other identification information. After the HBS information is received, block 504, the mobile telephone 110 stores the HBS information in its storage unit 316.

A mobile telephone 110 can be registered with a HBS 104 and subsequently can move away from the HBS' coverage area. The removal will not erase the registration information and the mobile telephone 110 can reestablish the connection, without the need for registration, with the HBS 104 once it returns to the HBS' coverage area. The mobile telephone can de-register itself with a HBS by deleting the stored HBS information from the storage unit 316. The HBS 104 can similarly de-register itself by removing the mobile telephone identification information from its RRU 214. Those skilled in the art will appreciate other ways to implement the registration and de-registration procedures between a mobile telephone 110 and a HBS 104.

After the mobile telephone 110 is removed from the coverage area of the HBS 104, the mobile telephone 110 enters a search mode and transmits a radio signal with its identification information, and the HBS 104 enters a detect mode and analyzes radio signals for mobile telephone identification. The HBS 104 exits the detect mode when it finds a mobile telephone identification for a registered mobile telephone 110, and the mobile telephone 110 exits from the search mode when it receives a request to establish communications.

In an alternative embodiment, where the HBS supports more than one mobile telephone, the HBS 104 continues in detect mode until all mobile telephones have been registered.

After the mobile telephone 110 and the HBS 104 are identified with each other, they exit from the registration mode and proceed to establish communications in the communication mode.

In an alternative embodiment, a mobile telephone 110 can register with multiple HBS' 104 and, conversely, a HBS 104 can also communicate with multiple mobile telephones 110.

Figure 6:
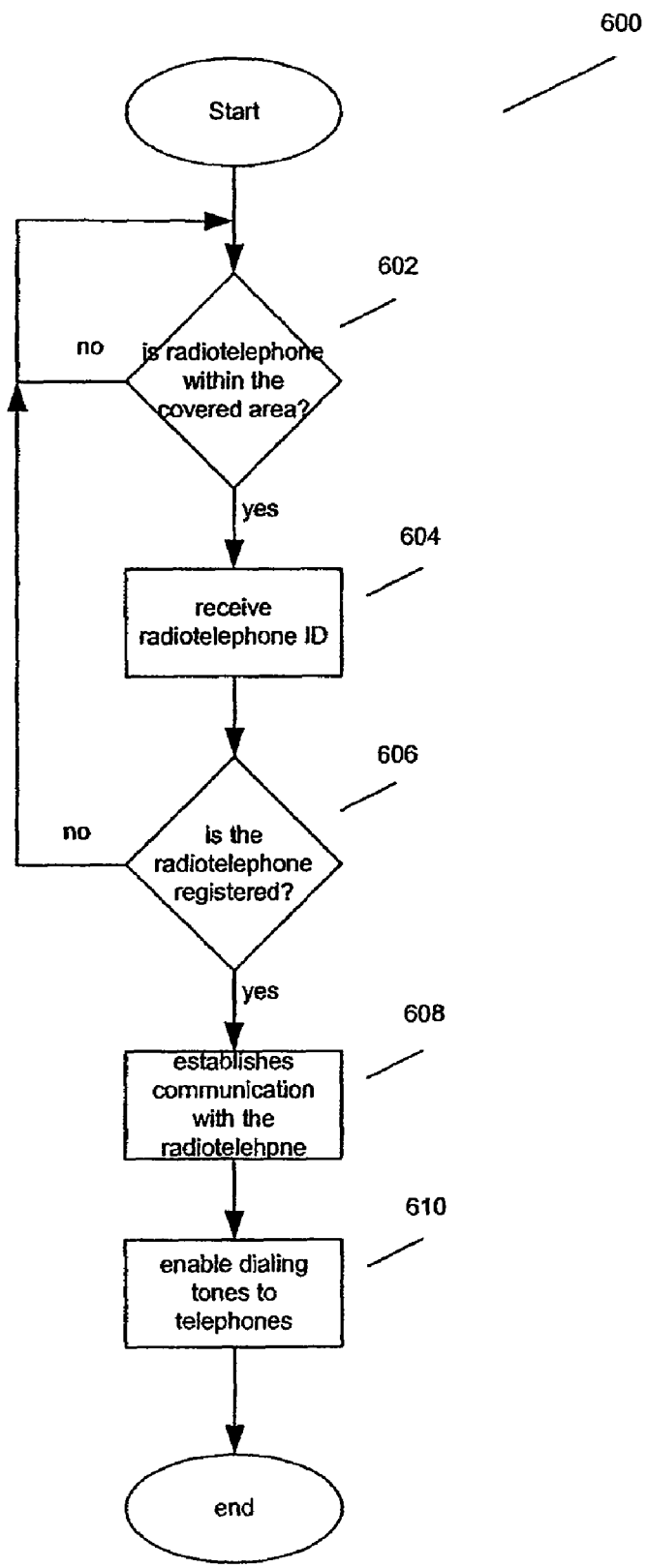
FIG. 6 depicts a HBS process for establishing a connection with a mobile telephone.

FIG. 6 depicts a detection process 600 for a HBS 104 to establish connections with a mobile telephone 110. This process 600 starts when no mobile telephone is in the HBS coverage area or the HBS is manually activated. The HBS 104 checks whether a mobile telephone is within its coverage area, block 602, by constantly receiving and analyzing radio signals, and if there is no mobile telephone 110 in its coverage area, the HBS 104 repeats the process of capturing and analyzing radio signals.

If a mobile telephone 110 is within the coverage area, the HBS 104 proceeds to receive the mobile telephone's identification information, which is preferably embedded in the radio signals emitted by the mobile telephone, block 604. The mobile telephone 110 constantly emits radio signals either indicating its presence or maintaining contact with the HBS 104. The extracted mobile telephone identification information is compared with the mobile telephone information stored by the RRU 214, block 606, and, if they do not match, the mobile telephone 110 is not registered with the HBS 104 and the HBS 104 goes back to the step of capturing and analyzing radio signals.

If the mobile telephone identification from the radio signals matches the mobile telephone information from RRU 214, the mobile telephone 110 is registered with the HBS 104, and the HBS 104 proceeds to establish communications with the mobile telephone 110, block 608. After establishing communications with the mobile telephone 110, the HBS 104 enables dial tones to the telephone devices, and the telephone devices are ready to place or to receive a call like a traditional wireline or landline telephone. HBS can also plug into a premises with existing wireline connections for corded and cordless phones with dial tone.

Figure 7:
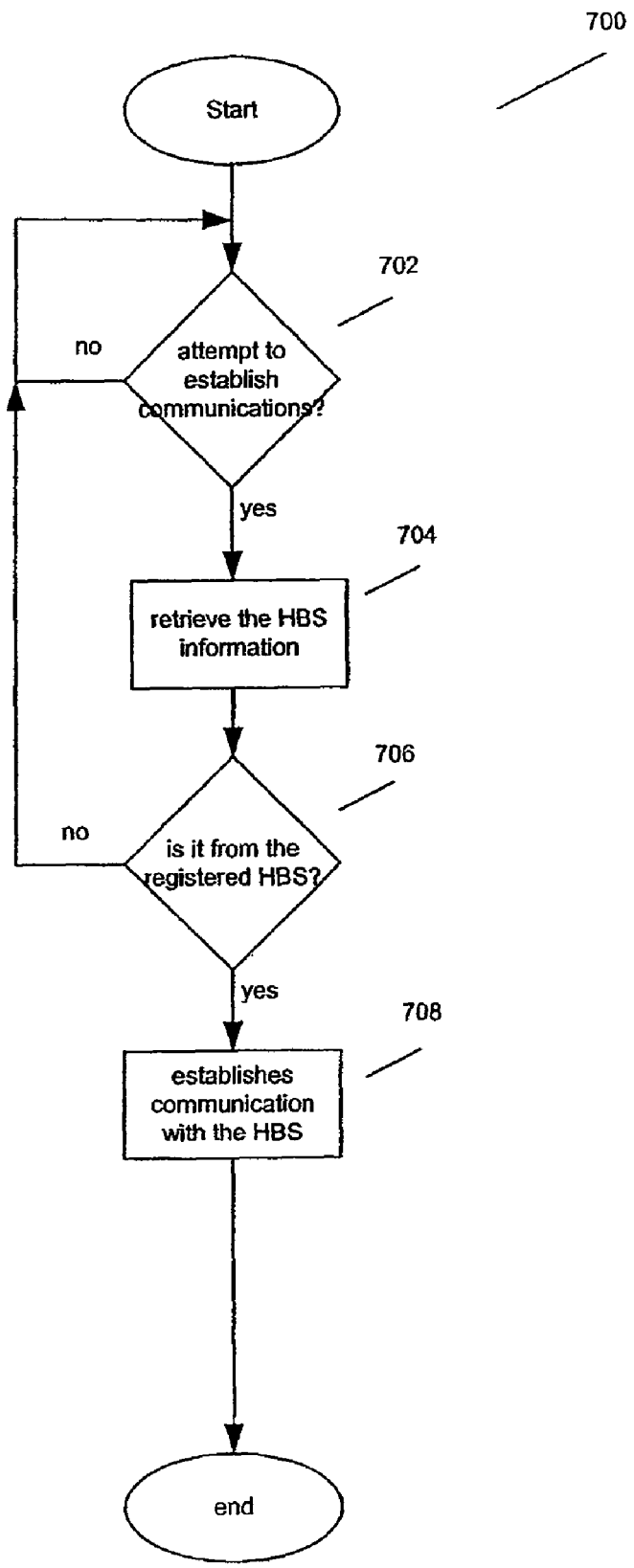
FIG. 7 depicts a mobile telephone process for establishing a connection with a HBS.

FIG. 7 depicts a search mode process 700 for a mobile telephone 110. While the mobile telephone 110 is sending out its identification information, it is also checking for attempts to establish communications, block 702. If the mobile telephone 110 detects a request to establish communications, the mobile telephone 110 retrieves the identity of the HBS 104 making the request, block 704 and checks whether the HBS 104 is a registered HBS, block 706. If the HBS 104 is not a registered HBS, i.e., the identification retrieved does not match the HBS identification information stored in the storage unit 316, then the mobile telephone 110 drops the request and returns to monitoring requests, block 702. If the HBS 104 is a registered HBS, the mobile telephone 110 establishes communications with the HBS 104.

Figure 8:
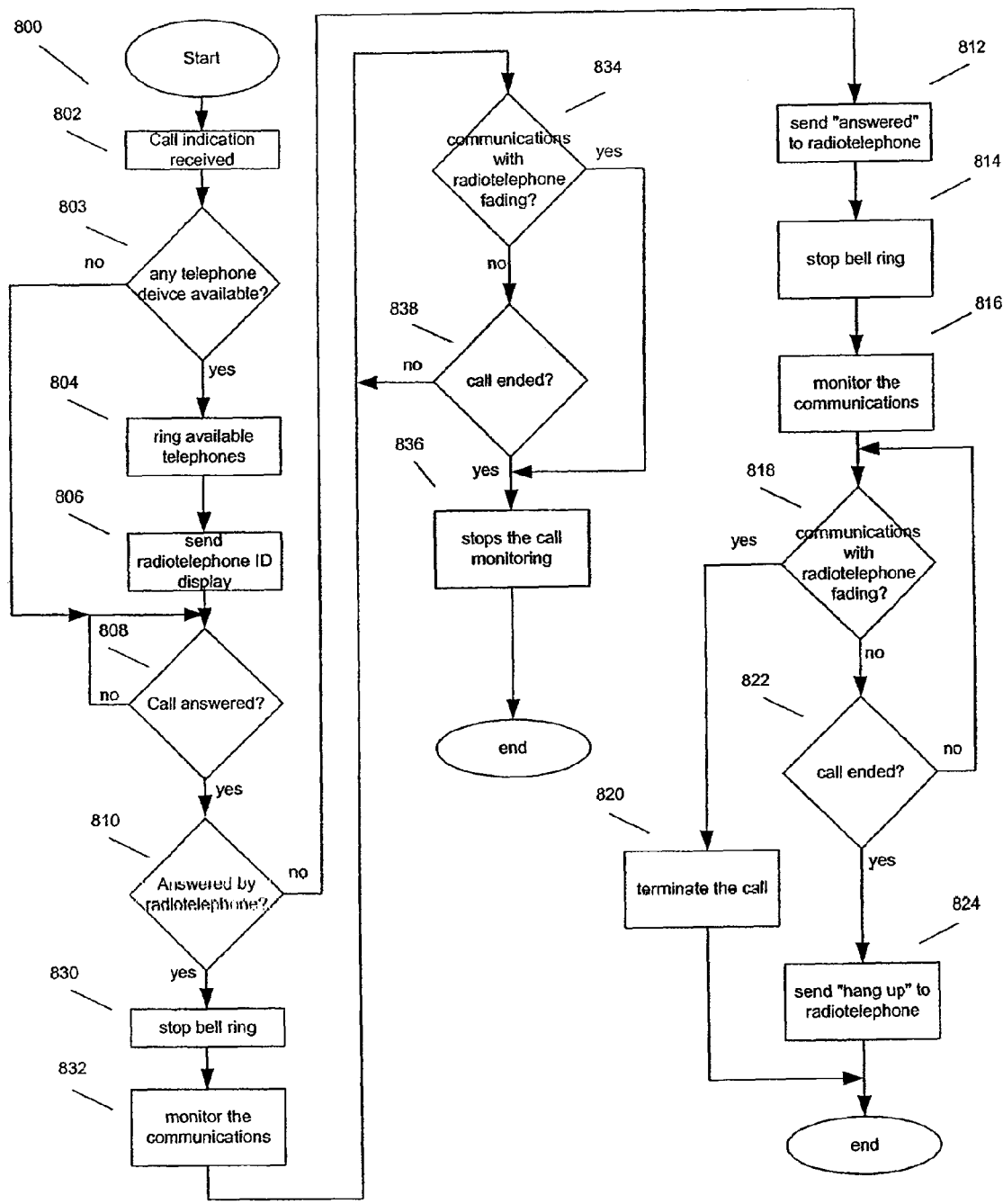
FIG. 8 depicts a HBS process for receiving an incoming call.

FIG. 8 illustrates a HBS process 800 for receiving an incoming call. An incoming call is first received by the mobile telephone 110, which sends a message to the HBS 104 indicating there is an incoming call. The HBS 104 receives the incoming call indication, block 802, and checks if any telephone device is available, block 803. A telephone device may not be available for answering an incoming call for two reasons: it is already on a call with a remote party, or it is on a call with another telephone device in the intercom mode. A telephone device may be on a call with a remote party, if the HBS supports more than one mobile telephone.

If there is no telephone device available for answering the incoming call, the HBS starts to monitor whether the call has been answered, block 808.

If there is one or more telephone devices available for answering the incoming call, the HBS rings the telephone devices, block 804. These telephone devices will ring at the same time the mobile telephone 110 is ringing.

The HBS 104 will also send the mobile telephone's identification to the telephone devices, block 806. For an embodiment that supports multiple mobile telephones, the mobile telephone's identification displayed on the telephone devices tells a user from which mobile telephone the incoming call is coming. The display of mobile telephone identification is in addition to caller identification normally displayed by the telephone devices if the user subscribes to a caller identification service.

In an alternative embodiment, the identification of the mobile telephone carrying the incoming call may be through a distinctive ringing tone. In this embodiment, each mobile telephone is associated with a distinctive ringing tone.

The HBS 104 monitors whether the call has been answered, block 808. If the call is answered, the HBS 104 checks whether the call is answered by the mobile telephone, block 810. A call is answered by the mobile telephone 110, if the HBS 104 receives a message from the mobile telephone 110 indicating the call has been answered. If the call is not answered by the mobile telephone but rather by a telephone device, the HBS 104 sends an "answered" message to the mobile telephone 110, block 812, and stops the telephone device bells from ringing, block 814. After the call is answered, the HBS 104 establishes an audio connection between the HBS 104 and the mobile telephone 110 and monitors the communication, block 816.

While the user is communicating using the telephone device, the HBS constantly determines whether the communication with the mobile telephone is fading, i.e., whether the strength of the radio signal from the mobile telephone is decreasing, block 818. If the signal fades beyond a threshold level, the HBS terminates the call, block 820 because the mobile telephone 110 has moved out of the HBS 104 coverage area. When the HBS 104 can no longer send and receive messages to and from the mobile telephone 110, it means the HBS 104 can no longer receive audio messages from the mobile telephone 110. Therefore, the HBS 104 terminates the call.

The HBS also monitors whether the call has ended, block 822. If the call has not ended nor has the communications faded, the HBS continues to monitor these two conditions. If the call has ended, the HBS 104 sends a "hang-up" message to mobile telephone, block 824.

Back to block 810, if the call is answered by the mobile telephone 110 because an "answered" message is received from the mobile telephone 110, the HBS 104 stops the telephone device bells from ringing, block 830. After the call is answered, the HBS 104 establishes an audio connection between the HBS 104 and the mobile telephone 110 and monitors the communication, block 832.

In an alternative embodiment, if the call is answered by the mobile telephone, the HBS can disable communication with the telephone devices to provide privacy for the mobile telephone user. In yet another embodiment, the telephone devices may be enabled to communicate with the mobile telephone through the HBS.

The HBS constantly determines whether the communication with the mobile telephone is fading, block 834. If the signal fades beyond a threshold level, the HBS stops monitoring the communication, block 836. The signal fading beyond a threshold level means that the mobile telephone 110 is moving out of the HBS 104 coverage area. Since the call was answered by the mobile telephone 110 and the mobile telephone is moving out of the HBS 110 coverage area, there is no need for the HBS to continue monitoring the communication. The HBS 110 just returns to its search mode.

The HBS also monitors whether the call has ended, block 838. If the call has not ended nor has the communications faded, the HBS continues to monitor these two conditions. If the call has ended because a "hang-up" message is received from the mobile telephone 110, the HBS 104 stops monitoring the communication, block 836.

Figure 9:
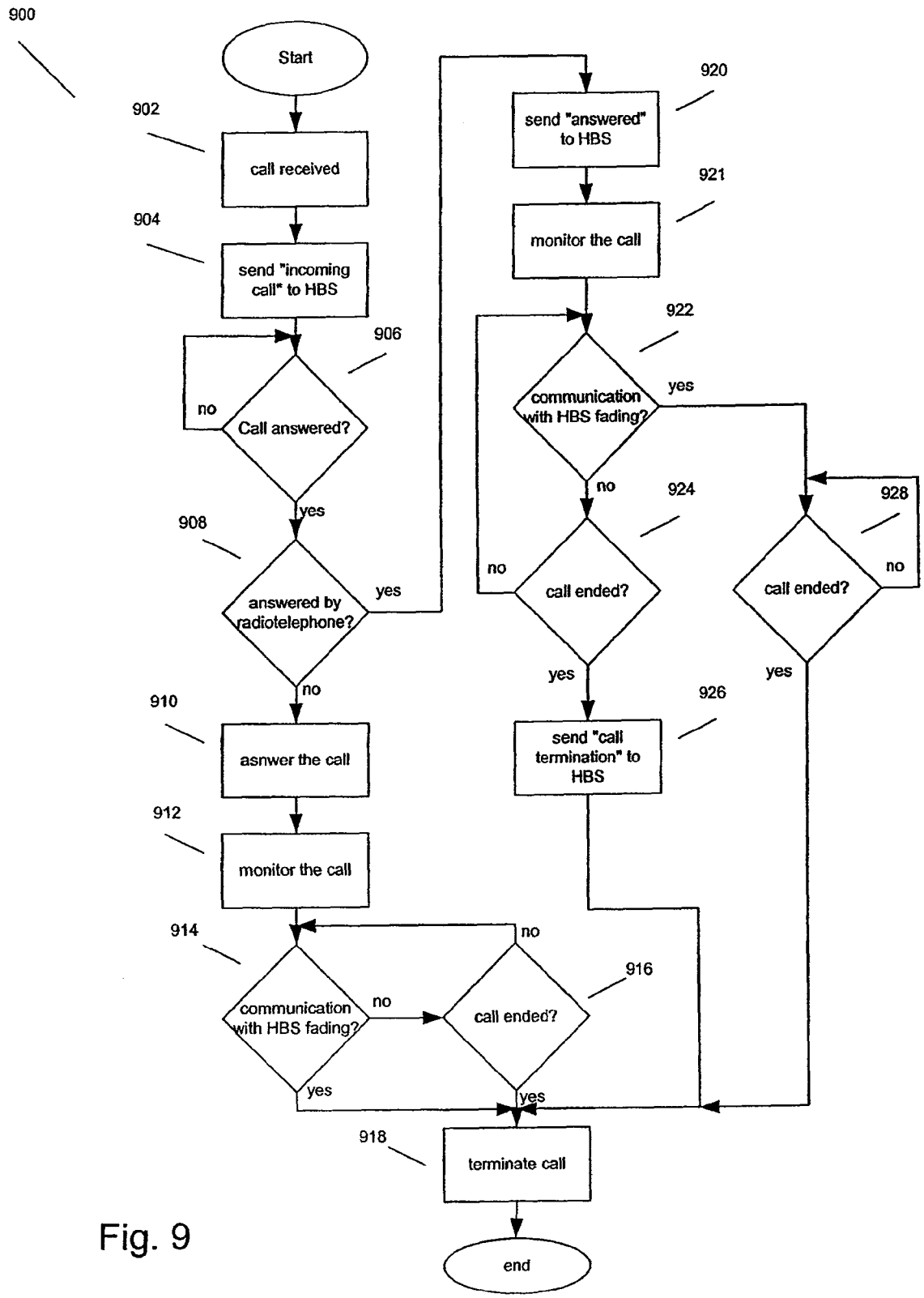
FIG. 9 depicts a mobile telephone process for receiving an incoming call.

FIG. 9 depicts a mobile telephone process 900 for receiving an incoming call. When the mobile telephone 110 receives a call, block 902, it sends an "incoming call" message to the HBS 104, block 904. The mobile telephone continuously checks whether the call has been answered, block 906. When the call is answered, the mobile telephone 110 checks whether the call is answered by the mobile telephone 110, block 908.

If the call is not answered by the mobile telephone 110, i.e., it is answered by a telephone device connected to the HBS 104, the HBS 104 sends an "answered" message to the mobile telephone 110. Upon receipt of the "answered" message, the mobile telephone 110 answers the call, block 910, establishes an audio connection to the HBS 104, and monitors the call, block 912. The mobile telephone can also participate in the call. The call monitoring essentially entails checking whether the radio signal from the HBS is fading, block 914, and whether the call has ended, block 916. If the radio signal from the HBS is fading because the mobile telephone is physically moved away from the HBS, the mobile telephone terminates the call, block 918. If the radio signal from the HBS is fading when the call is answered by a telephone device connected to the HBS, it means that the mobile telephone is being removed from the HBS' coverage area. The mobile telephone terminates the call in this situation to restore the mobile telephone to its original state as an independent and detached communication device.

If the call has ended, i.e., the mobile telephone receives a "hang-up" message from the HBS, then the mobile telephone terminates the call, block 918.

Now back to block 908, if the call is answered by the mobile telephone 110, the mobile telephone sends an "answered" message to the HBS 104 indicating the call has been answered, block 920. The mobile telephone 110 also establishes an audio connection with the HBS 104 and monitors the call, block 921. The audio connection to the HBS is established so that another user may pick up a telephone device connected to the HBS and participate in the conversation.

If the mobile telephone 110 detects that communication with the HBS is fading, i.e., the radio signal strength from the HBS is weakening, the mobile telephone 110 continues to monitor whether the user at the mobile telephone has ended the call, block 928. If the user hangs up, the mobile telephone 110 terminates the call, block 918.

If the communications between the mobile telephone 110 and the HBS 104 is not fading and the mobile telephone detects the call has ended, block 924, the mobile telephone 110 sends a "hang-up" message to the HBS indicating the call is terminated, block 926. The mobile telephone 110 also terminates the call, block 918.

Figure 10:
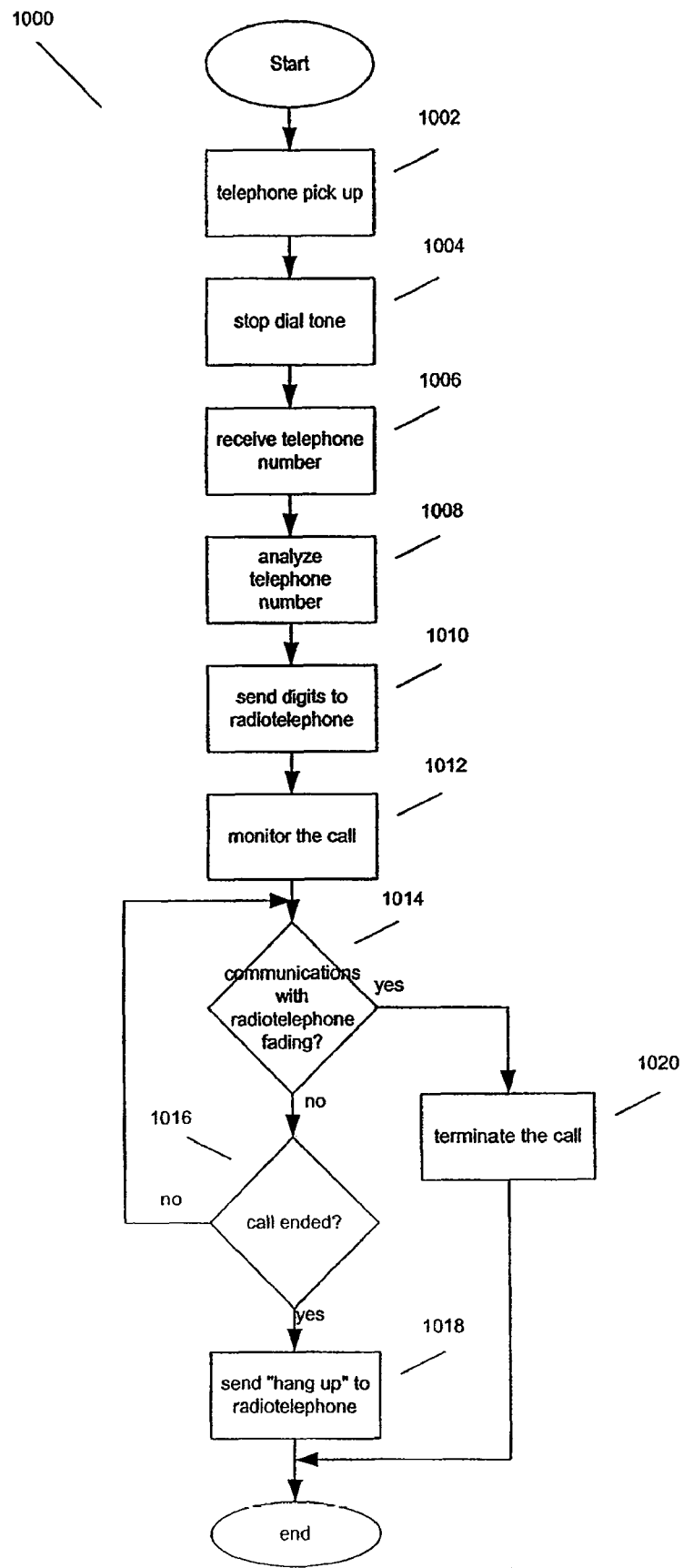
FIG. 10 depicts a HBS process for making an outgoing call.

FIG. 10 illustrates a HBS process 1000 for placing an outgoing telephone call. The process starts when the HBS detects a user picking up a telephone device connected to the HBS, block 1002, and stops the dial tone for a wired telephone after the first digit is entered, block 1004. The HBS receives the telephone number (the dialed digits), block 1006, and analyzes the telephone number, block 1008. The HBS analyzes the telephone number entered by the user in order to determine whether the user has finished entering the telephone number. The HBS is equipped with circuitry that can determine whether a user has finished dialing a telephone number.

In an alternative embodiment, the HBS need not analyze the telephone number entered, if the telephone devices connected to the HBS are equipped with a "send" button. A user can press the "send" button after entering a destination telephone number, and the "send" button indicates to the HBS that the user has finished entering the telephone number.

After a user finishes entering the destination telephone number, the HBS sends the destination telephone number to the mobile telephone, block 1010, which in turn sends the telephone number out to the wireless telephone network, as is well known to those skilled in the art. The HBS proceeds to establish an audio connection between the mobile telephone and the HBS monitors the call, block 1012.

The HBS checks whether the communications with the mobile telephone is fading, block 1014, and whether the call has ended, block 1016. If the radio signal from the mobile telephone is fading, the HBS proceeds to terminate the call, block 1020. If the communication is not fading, but the call has ended, the HBS sends a "hang-up" message to the mobile telephone, block 1018.

In another embodiment, the HBS can select between two or more available mobile telephones to establish communication. Selection criteria may include strongest radio signal strength, history for remaining within the HBS coverage area (mobility history), history of the quality of connections to the HBS, user preference, and the like. If a mobile telephone has a history of leaving frequently the HBS coverage area, the HBS may not want to select this mobile telephone when there is another mobile telephone available. If a mobile telephone has a history of providing lower quality of connection to the HBS, this mobile telephone may not be a good candidate when the HBS is selecting a mobile telephone for carrying out an outgoing communication. The HBS may select automatically one mobile telephone for communication with the wireless telecommunications network according to an internal logic according to a predefined criteria. The HBS may also allow the user to determine which mobile telephone to use by providing a mobile telephone selector, which may be an interface screen displayed on the HBS's user interface screen. The HBS may also provide the selection through a plurality of buttons on the HBS, wherein each button is associated with one mobile telephone.

Figure 11:
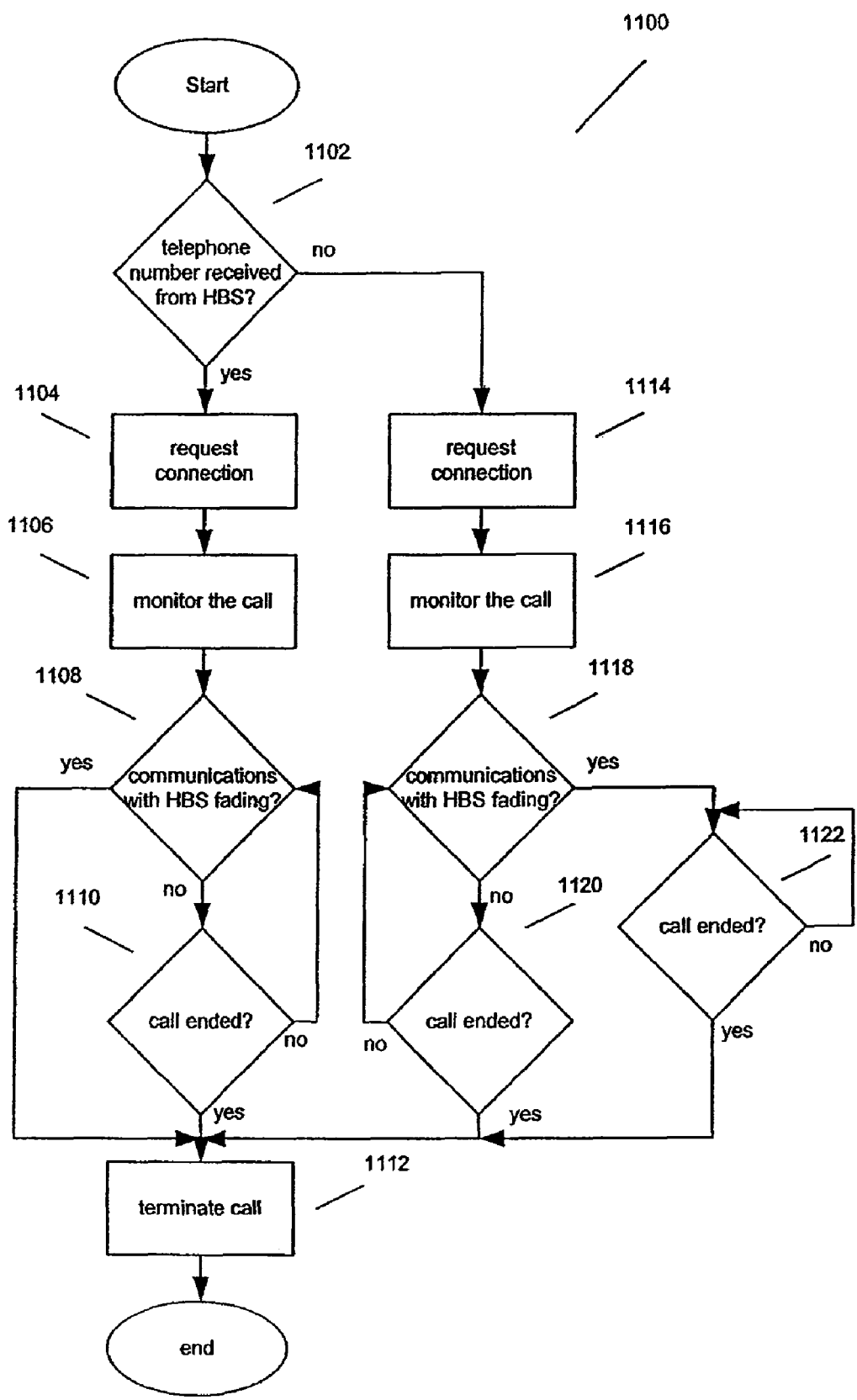
FIG. 11 depicts a mobile telephone process for making an outgoing call.

FIG. 11 illustrates a mobile telephone process 1100 for placing an outgoing call. An outgoing call starts when a telephone number is entered on the mobile telephone or received from the HBS. The mobile telephone 110 checks whether the telephone number is received from the HBS, block 1102. If the telephone number is received from the mobile telephone 110, the mobile telephone 110 sends the telephone number to the wireless network and requests a connection to the destination telephone, block 1114. The connection is handled through a Mobile Switching Center (MSC).

The mobile telephone also establishes an audio connection to the HBS so that the telephone devices can be enabled and monitors the call, block 1116. The mobile telephone 110 checks whether the radio signal from the HBS 104 is fading, block 1118, and whether the call has ended, block 1120. If the mobile telephone 110 detects the radio signal from the HBS is fading, it then continues to check whether the call has ended, block 1122. After the call has ended, i.e., the user hangs up the mobile telephone, the mobile telephone terminates the call, block 1112. If the radio signal is not fading but the user has ended the call, the mobile telephone proceeds to terminate the call, block 1112.

Back to block 1102, if the telephone number is from the HBS 104, the mobile telephone 110 sends the telephone number to the wireless network and requests a connection to the destination telephone, block 1104. The mobile telephone also establishes an audio connection to the HBS and monitors the call, block 1106. The mobile telephone 110 checks whether the radio signal from the HBS 104 is fading, block 1108, and whether the call has ended, block 1110.

If the communication between the mobile telephone 110 and the HBS 104 is fading, then the mobile telephone terminates the call, block 1112. If the communications are not fading, but the call ends because a "hang-up" is received from the HBS, then the mobile telephone 104 terminates the call, block 1112.

Figure 12:
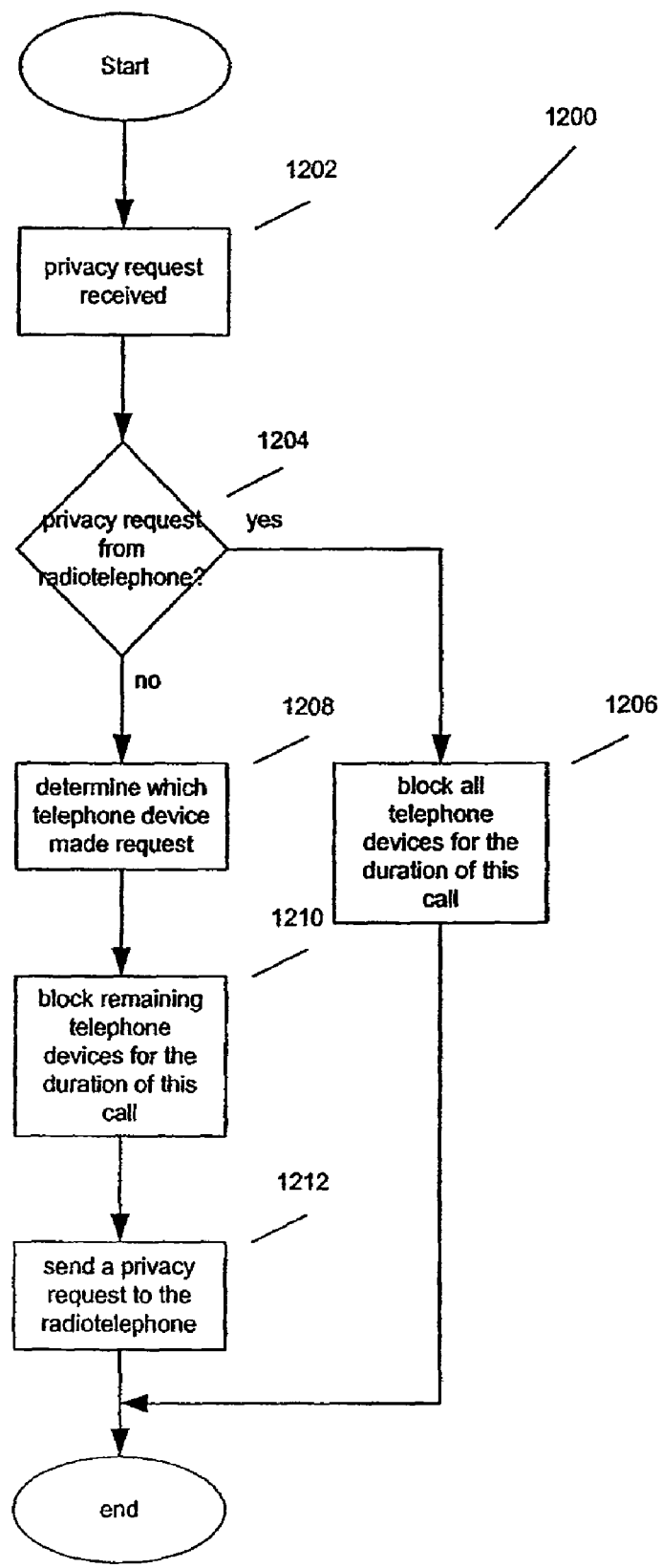
FIG. 12 depicts a HBS process for handling a privacy request.

FIG. 12 illustrates a HBS process 1200 for handling privacy requests. The HBS can provide privacy to a user who is in communication with a remote party, and the HBS can prevent a third party from listening to the communication by picking up a telephone device connected to the HBS.

A user may request privacy while a communication is established with a remote party. The user may make a privacy request by pressing a special privacy request button on a mobile telephone or a telephone device. The user may also request privacy by pressing a special sequence of buttons currently available on the mobile telephone and the telephone devices. For example, the user may press "" to request for privacy. If the user is using the mobile telephone, then the mobile telephone's controller 314 will understand that "" is a privacy request to be sent to the HBS. If the user is using a telephone device, "**" is received and interpreted by the HBS.

The process 1200 starts after a privacy request message is received from the mobile telephone or a special sequence of digits are received from a telephone device, block 1202. The HBS checks whether the privacy request is from the mobile telephone, block 1204, and if so, the HBS will block or disable audio connections to all telephone devices connected to it, block 1206, for the duration of the call.

If the privacy request is from a telephone device, the HBS determines which telephone device made the privacy request, block 1208. After determining the telephone device that made the privacy request, the HBS blocks or disables the audio connections to other telephone devices connected to the HBS for the duration of the call, block 1210. The HBS also sends a privacy request message to the mobile telephone, block 1212, and the mobile telephone will disable its audio input and output units for the duration of the call. The mobile telephone continues to act as a communication medium for the HBS while its speaker and microphone are disabled.

In operation, the HBS 104 provides expanded services to a user of a mobile telephone 110. The following is a description of one use scenarios for the HBS used in a home environment and connected to corded as well as cordless telephone devices. While the user is away from home with his mobile telephone, the HBS 104 does not provide dial tones to the telephone devices at home, if the user's mobile telephone is the only mobile telephone registered with the HBS or the telephone devices are not connected to a local wireline telephone service provider.

Before using the HBS, the user needs to register his mobile telephone with the HBS. In one embodiment, the registration procedure is activated by making the HBS and the mobile telephone enter the registration mode. While in the registration mode, the mobile telephone sends its identification information with a predefined radio signal, at the same time monitoring for the HBS identification information. The HBS searches for the predefined radio signal and extracts it from the mobile telephone's identification information. After storing the mobile telephone's identification information, the HBS sends its own identification to the mobile telephone. The mobile telephone receives the HBS' identification and stores it. The HBS and the mobile telephone will provide an indication when they are done with the registration procedure. The identification information stored during the registration procedure is not erased when the mobile telephone is removed from the HBS' coverage area.

When the user arrives home with his mobile telephone, the HBS senses/detects the presence of the mobile telephone within its coverage area and sends a request to establish the connection with the mobile telephone. The mobile telephone receives the request and checks the HBS' identification against the stored information. If the HBS identification matches the stored information, the mobile telephone accepts the request and the communication between the mobile telephone and the HBS is then established. Subsequently, if needed, the HBS starts to provide the dial tones to the telephone devices connected to it.

If the user leaves his mobile telephone inside his car in the garage and there is an incoming call to his mobile telephone, the mobile telephone sends an "incoming call" message to the HBS. The "incoming call" message alerts the HBS about the incoming call, and the SIBS checks which mobile telephone has received the call. The HBS also proceeds to check whether there is any telephone device available for answering the incoming call. If there are two telephone devices connected to the HBS and they are communicating with each other in the intercom mode, then there is no telephone device available for answering the call. Although there is no telephone device available for answering the incoming call, the incoming call can still be answered by the mobile telephone.

If there are unused telephone devices, the HBS sends the mobile telephone's identification information to these telephone devices and also rings these telephone devices. The identification of the mobile telephone is important, because the HBS may have two mobile telephones registered: one for the husband and one for the wife. If the call is from the wife's mobile telephone, the husband may not want to answer it. Different ringing tones can be used to distinguish the mobile telephone receiving the call.

After the user picks up any telephone device inside the home to answer the call, the HBS stops the telephone device bells from ringing and sends an "answered" message to the mobile telephone. After receiving the "answered" message, the mobile telephone establishes an audio path to the HBS and answers the call.

While the user is on the call, the user may request privacy as to prevent another person from listening to his conversation from another telephone device located in a different room. The user can press, for example, "*#" to send the privacy request to the HBS. Upon receiving the privacy request, the HBS determines which telephone device originated the privacy request and disables the audio connections to other telephone devices. The HBS also sends a privacy request to the mobile telephone. When the mobile telephone receives the privacy request, the mobile telephone disables its speaker and microphone, so that no one can use the mobile telephone to listen to the conversation.

The disabling of other telephone devices and the disabling of the speaker and the microphone of the mobile telephone are limited to the current call, and after the call has ended the communication to all the telephone devices are restored and the mobile telephone is restored as well.

After the user hangs up the telephone device at the end of call, the HBS sends a "hang up" message to the mobile telephone, and the mobile telephone then proceeds to terminate the call.

In an alternative embodiment, the HBS can include one or more docking stations to dock one or more mobile telephones. A docking station is equipped with a battery charger and provides physical connection between the mobile telephones and the HBS's MTIU. The docking station may be a physically integrated to the HBS or separated from the HBS but connected through cables. When a mobile telephone is docked at the docking station, the mobile telephone may communicate with the HBS through wired connections instead of wireless transmissions. While the mobile telephone is docked at the docking station, the docking station recharges the mobile telephone's battery through its battery charger.

Those skilled in the art will appreciate other features normally offered in a telephone system, such as call waiting, call forwarding, voice mail, three way conference, caller identification, repeat dialing, call return, etc., can easily be incorporated in different embodiments of the present invention without diverting from the spirit and the scope of the present invention.

The foregoing description of preferred embodiments of the invention has been presented only for the purpose of illustration and description and is not intended to be exhaustive or to limit the invention to the precise forms disclosed. Many modifications and variations are possible in light of the above teaching.

The foregoing embodiments were chosen and described in order to explain the principles of the invention and their practical applications and to enable others skilled in the art to utilize the invention and various embodiments, including various modifications as are suited to the particular use contemplated.

What is claimed is:

1. Customer premises equipment for placing a telephone call to a remote telephone via a mobile telephone, the customer premises equipment for use in a system for providing communication services through a mobile telecommunications network, the customer premises equipment comprising:
   a controller;
   a mobile telephone interface unit for communication with the mobile telephone;
   a mobile telephone registration unit, configured to wirelessly detect presence of the mobile telephone, the mobile telephone registration unit further configured to store information identifying the mobile telephone;
   a local telephone registration unit coupled to a plurality of local telephones, the plurality of local telephones comprising a local telephone and a second local telephone, wherein the local telephone registration unit is in communication with the mobile telephone registration unit, and the local telephone registration unit is configured to detect a network status of the local telephone;
   a privacy unit to provide privacy when receiving a first privacy request signal from the local telephone during the telephone call between the local telephone device and the remote telephone, the first privacy signal requests that the mobile telephone and the second local telephone be prevented from receiving audio communication from the telephone call between the local telephone and the remote telephone via the mobile communications network, and the privacy unit provides privacy when receiving a second privacy request signal from the mobile telephone during the telephone call, the second privacy request signal requesting that the second local telephone be prevented from receiving audio communication from the telephone call between the mobile telephone and the remote telephone via the mobile communications network, and wherein the local telephone placing the telephone call through the mobile telephone interface unit is configured with a privacy request button to signal the first privacy request to the privacy unit to prevent the second local telephone and the mobile telephone from receiving audio communication from the telephone call to the remote telephone.

2. The customer premises equipment in accordance with claim 1, wherein the controller places the telephone call via the mobile telephone interface unit.

3. The customer premises equipment in accordance with claim 1, wherein communication between the mobile telephone interface unit and the mobile telephone follows Bluetooth protocols.

4. The customer premises equipment in accordance with claim 1, wherein the local telephone includes a corded telephone.

5. The customer premises equipment in accordance with claim 4, wherein the local telephone includes a cordless telephone.

6. The customer premises equipment in accordance with claim 1, wherein the mobile telephone is one of a plurality of mobile telephones and the controller places the telephone call via the mobile telephone as a selected one of the plurality of mobile telephones.

7. The customer premises equipment in accordance with claim 1, wherein the controller provides information identifying the mobile telephone for display to a user.

8. A method for facilitating communications with a mobile telephone via a mobile communications network, the method comprising:

registering the mobile telephone for providing communications services to a first local telephone device;

wirelessly detecting presence information for the mobile telephone;

collecting dialed digits from the first local telephone device;

sending data related to the dialed digits to the mobile telephone, the mobile telephone being configured to facilitate a communication between the first local telephone device and a remote telephone via the mobile communications network;

receiving a first privacy request signal from the first local telephone device during the communication, the first privacy request signal requesting that the mobile telephone and a second local telephone be prevented from receiving audio communication from the communication between the first local telephone device and the remote telephone via the mobile communications network;

responsive to receiving the first privacy request signal during the communication, disabling audio communication to the second local telephone and instructing the mobile telephone to disable audio communication;

receiving a second privacy request signal from the mobile telephone during the communication, the second privacy request signal requesting that the second local telephone be prevented from receiving audio communication from the communication; and responsive to receiving the second privacy request signal during the communication, disabling audio communication to the second local telephone.

9. The method of claim 8, wherein the dialed digits are received from the first local telephone device via a wireless communication.

10. The method of claim 8, wherein registering the mobile telephone includes registering a plurality of mobile telephones.

11. The method of claim 8, further comprising providing intercom communication services for the first local telephone device.

12. A method for facilitating communication with a remote telephone via a mobile telephone, the method comprising:

receiving, wirelessly, identification information related to the mobile telephone for providing communication services to a local telephone device at a home base station;

comparing the received identification information with information related to a registered mobile telephone at the home base station;

in response to determining that the received identification information matches the information related to the registered mobile telephone, facilitating, by the home base station, a communication over a mobile communications network between the local telephone device and the remote telephone via the mobile telephone, wherein the mobile telephone is configured to send a first privacy request signal during the communication to prevent a second local telephone device from receiving data from the communication, and the local telephone device is configured to send a second privacy request signal during the communication to prevent the mobile telephone and the second local telephone device from receiving data from the communication.

13. The method of claim 12, wherein the identification information is received via a wireless communication from the mobile telephone.

14. The method of claim 13, wherein the wireless communication follows a Bluetooth protocol.

15. The method of claim 12, wherein in response to determining that the identification information does not match information related to the registered mobile communication device, determining that the mobile communication device is not registered.

16. The method of claim 12, further comprising displaying at least a portion of the received identification information.

17. The method of claim 12, wherein the mobile communication device includes a cellular telephone.

18. The method of claim 12, wherein the local telephone device includes of the following: a wire-line telephone and cordless telephone.

19. The method of claim 12, wherein facilitating communication with the remote telephone via the mobile telephone includes determining dialed digits for communication with the remote telephone.

20. The method of claim 12, in response to determining that the received identification information does not match information related to the registered mobile telephone, registering the mobile telephone.

* * * * *